(12) United States Patent
Ryu et al.

(10) Patent No.: US 8,305,507 B2
(45) Date of Patent: Nov. 6, 2012

(54) THIN FILM TRANSISTOR ARRAY PANEL HAVING IMPROVED STORAGE CAPACITANCE AND MANUFACTURING METHOD THEREOF

(75) Inventors: Hye-Young Ryu, Seoul (KR); Jang-Soo Kim, Suwon-si (KR); Sang-Gab Kim, Seoul (KR); Hong-Kee Chin, Suwon-si (KR); Min-Seok Oh, Suwon-si (KR); Hee-Hwan Choe, Incheon-si (KR); Shi-Yul Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 498 days.

(21) Appl. No.: 11/356,853

(22) Filed: Feb. 17, 2006

(65) Prior Publication Data

US 2006/0192906 A1    Aug. 31, 2006

(30) Foreign Application Priority Data

Feb. 25, 2005 (KR) .................. 10-2005-0015914
Apr. 27, 2005 (KR) .................. 10-2005-0034964

(51) Int. Cl.
*G02F 1/1343* (2006.01)

(52) U.S. Cl. ............ 349/39; 349/38; 349/139; 349/140

(58) Field of Classification Search .............. 349/111, 349/38, 39, 139–140
See application file for complete search history.

(56) References Cited

U.S. PATENT DOCUMENTS

| | | | |
|---|---|---|---|
| 6,038,006 A * | 3/2000 | Sasaki et al. ............... | 349/106 |
| 6,046,063 A | 4/2000 | Jun et al. | |
| 6,075,580 A * | 6/2000 | Kouchi ......................... | 349/110 |
| 6,255,130 B1 * | 7/2001 | Kim ................................ | 438/30 |
| 6,271,543 B1 * | 8/2001 | Ohtani et al. .................. | 257/72 |
| 6,356,318 B1 | 3/2002 | Kawahata | |
| 6,395,586 B1 | 5/2002 | Huang et al. | |
| 6,490,014 B1 | 12/2002 | Ohtani et al. | |
| 2001/0035919 A1 * | 11/2001 | Zhang ............................. | 349/44 |
| 2003/0197178 A1 * | 10/2003 | Yamazaki et al. .............. | 257/59 |
| 2004/0169991 A1 * | 9/2004 | Nagata et al. .............. | 361/301.1 |
| 2004/0183977 A1 * | 9/2004 | Kitagawa et al. ............. | 349/141 |
| 2004/0263756 A1 * | 12/2004 | Tak et al. ...................... | 349/145 |
| 2005/0036096 A1 * | 2/2005 | Takatori et al. .............. | 349/156 |
| 2006/0062352 A1 * | 3/2006 | Nomura et al. ............. | 378/98.8 |

FOREIGN PATENT DOCUMENTS

| | | |
|---|---|---|
| CN | 1129035 | 8/1996 |
| CN | 1290039 | 4/2001 |
| CN | 1573486 | 2/2005 |
| JP | 6347826 | 12/1994 |
| JP | 08-062629 | 8/1996 |
| JP | 10-048664 | 2/1998 |
| JP | 10-073840 A | 3/1998 |
| JP | 10-096949 A | 4/1998 |

(Continued)

*Primary Examiner* — Lauren Nguyen
(74) *Attorney, Agent, or Firm* — Innovation Counsel LLP

(57) ABSTRACT

A thin film transistor array panel is provided, which includes a gate line, a data line intersecting the gate line, a storage electrode apart from the gate and data lines, a thin film transistor connected to the gate and data lines and having a drain electrode, a pixel electrode connected to the drain electrode, a first insulating layer over the thin film transistor and disposed under the pixel electrode, and a second insulating layer disposed on the first insulating layer and having an opening exposing the first insulating layer on the storage electrode.

18 Claims, 34 Drawing Sheets

FOREIGN PATENT DOCUMENTS

| | | |
|---|---|---|
| JP | 10186408 | 7/1998 |
| JP | 10-206888 A | 8/1998 |
| JP | 10-268353 A | 10/1998 |
| JP | 11095261 | 4/1999 |
| JP | 2000-267128 | 9/2000 |
| JP | 2000-305106 A | 11/2000 |
| JP | 2000-323698 A | 11/2000 |
| JP | 2001-005038 A | 1/2001 |
| JP | 2001-056485 | 2/2001 |
| JP | 2003-121878 | 4/2003 |
| JP | 2005018079 | 1/2005 |
| KR | 0207491 | 4/1999 |
| KR | 0209623 | 4/1999 |
| KR | 1999-074557 | 5/1999 |
| KR | 1999024916 | 6/1999 |
| KR | 2000-034033 | 6/2000 |
| KR | 2003082385 | 10/2003 |
| KR | 2004-034161 | 4/2004 |
| KR | 2004-050771 | 6/2004 |
| KR | 0437825 | 6/2004 |
| KR | 2004083647 | 6/2004 |
| KR | 2004-062190 | 7/2004 |
| KR | 2004020672 | 9/2004 |
| KR | 1020040085415 A | 10/2004 |
| KR | 1020040095829 A | 11/2004 |
| KR | 1020050001707 A | 1/2005 |
| KR | 1020050009039 A | 1/2005 |
| KR | 1020050014060 A | 2/2005 |
| KR | 1020050017019 A | 2/2005 |

* cited by examiner

THIN FILM TRANSISTOR ARRAY PANEL HAVING IMPROVED STORAGE CAPACITANCE AND MANUFACTURING METHOD THEREOF

CROSS-REFERENCE TO RELATED APPLICATIONS

This application claims the benefit of Korean Patent Application No. 10-2005-0015914 filed on Feb. 25, 2005, and Korean Application No. 10-2005-0034964 filed on Apr. 27, 2005, the disclosures of which are incorporated herein by reference.

BACKGROUND (a) Field of the Invention

The present invention relates to a thin film transistor array panel, and a manufacturing method thereof.

(b) Description of the Related Art

Liquid crystal displays (LCDs) are one of the most widely used flat panel displays. An LCD includes two panels provided with field-generating electrodes and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

In LCDs that include field-generating electrodes on respective panels, a plurality of pixel electrodes arranged in a matrix are provided on one panel and a common electrode is provided covering an entire surface of the other panel. Image display of the LCD is accomplished by applying individual voltages to the respective pixel electrodes. For the application of the individual voltages, a plurality of three-terminal thin film transistors (TFTs) are connected to the respective pixel electrodes, and a plurality of gate lines transmitting signals for controlling the TFTs and a plurality of data lines transmitting voltages to be applied to the pixel electrodes are provided on the panel. Also, a plurality of storage electrodes overlapping the pixel electrodes to form a storage capacitor are provided on the panel.

Several photolithography steps are usually required for manufacturing the LCD panel. Since the production cost increases as the number of photolithography steps increases, it is preferable to reduce the number of photolithography steps. To reduce the production cost, the data lines and a semiconductor layer are patterned using one photoresist, including a portion having a middle thickness, as an etch mask.

However, because the semiconductor layer remains under a conductor connected to the pixel electrodes and overlaps the storage electrodes in this manufacturing method, a flicker on the screen as well as an afterimage are generated, thereby deteriorating the characteristics of the LCD.

SUMMARY

A thin film transistor array panel is provided, which includes: a gate line; a data line intersecting the gate line; a storage electrode apart from the gate and the data lines; a thin film transistor connected to the gate and the data lines and having a drain electrode; a pixel electrode connected to the drain electrode; a first insulating layer covering the thin film transistor and disposed under the pixel electrode; and a second insulating layer disposed on the first insulating layer, and having an opening exposing the first insulating layer on the storage electrode.

The first insulating layer may be made of inorganic material, and the second insulating layer may be made of organic material. The second insulating layer may include a color filter. The storage electrode may be made of the same layer as the gate line, and the contact hole to connect the pixel electrode and the drain electrode is disposed in the opening.

The thin film transistor array panel may further include a shielding electrode made of the same layer as the pixel electrode, and the shielding electrode and the pixel electrode may be disposed on the first and the second insulating layers. The storage electrode may be made of the same layer as the shielding electrode, and is extended from the shielding electrode. The storage electrode may overlap the drain electrode, it may be extended to the data line, and it may completely cover the boundaries of the data line.

The shielding electrode at least may overlap the portion of the gate line, and it may be extended to the data line and the gate line. The width of the shielding electrode may be larger than that of the data line and smaller than that of the gate line.

The pixel electrode may have a cutout, and it may include a first pixel electrode and a second pixel electrode coupled with the first pixel electrode.

The thin film transistor array panel may further include a coupling electrode connected to the drain electrode and overlapping the second pixel electrode, wherein the coupling electrode overlaps the second pixel electrode via only the first insulating layer.

A thin film transistor array panel is provided, which includes: a gate insulating layer on the gate line; a first semiconductor on the gate insulating layer; a data line and a drain electrode formed on the first semiconductor and separate from each other; a storage conductor formed on the gate insulating layer; a first passivation layer formed on the storage conductor, the data line, and the drain electrode; a second passivation layer formed on the first passivation layer and having an opening exposing the first passivation layer corresponding to the storage conductor; and a pixel electrode connected to the drain electrode on the second passivation layer and overlapping the storage conductor through the opening.

The first passivation layer may be thinner than the second passivation layer, and it may include inorganic material or the second passivation layer may include organic material.

The thin film transistor array panel may further include a second semiconductor made at the same layer as the first semiconductor, and disposed under the storage conductor. The first semiconductor, except for a portion between the data line and the drain electrode, may have the same plane shape as the data line and the drain electrode. The first semiconductor may be made of amorphous silicon.

The thin film transistor array panel may further include a shielding electrode formed on the second passivation layer and overlapping at least a portion of the gate line and the data line.

The first and second passivation layers may have a contact hole exposing the storage conductor, and the storage conductor is connected to the shielding electrode through the contact hole.

A method of manufacturing a thin film transistor array panel is provided, which includes: forming a gate line on an insulating substrate; forming a gate insulating layer covering the gate line; forming a semiconductor on the gate insulating layer; forming an ohmic contact layer on the semiconductor; forming a data line, a drain electrode apart from the data line, and a storage conductor on the ohmic contact layer; forming first and second passivation layers covering the data line, the drain electrode, and the storage conductor; etching the first and second passivation layers to form a contact hole exposing the drain electrode and an opening exposing the first passivation layer corresponding to the storage conductor; and forming a pixel electrode connected to the drain electrode through the contact hole and overlapping the storage conductor through the opening.

The semiconductors, the data line, the drain electrode, and the storage conductor may be formed by photolithography using one photoresist film as an etch mask.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION

Figure 1:
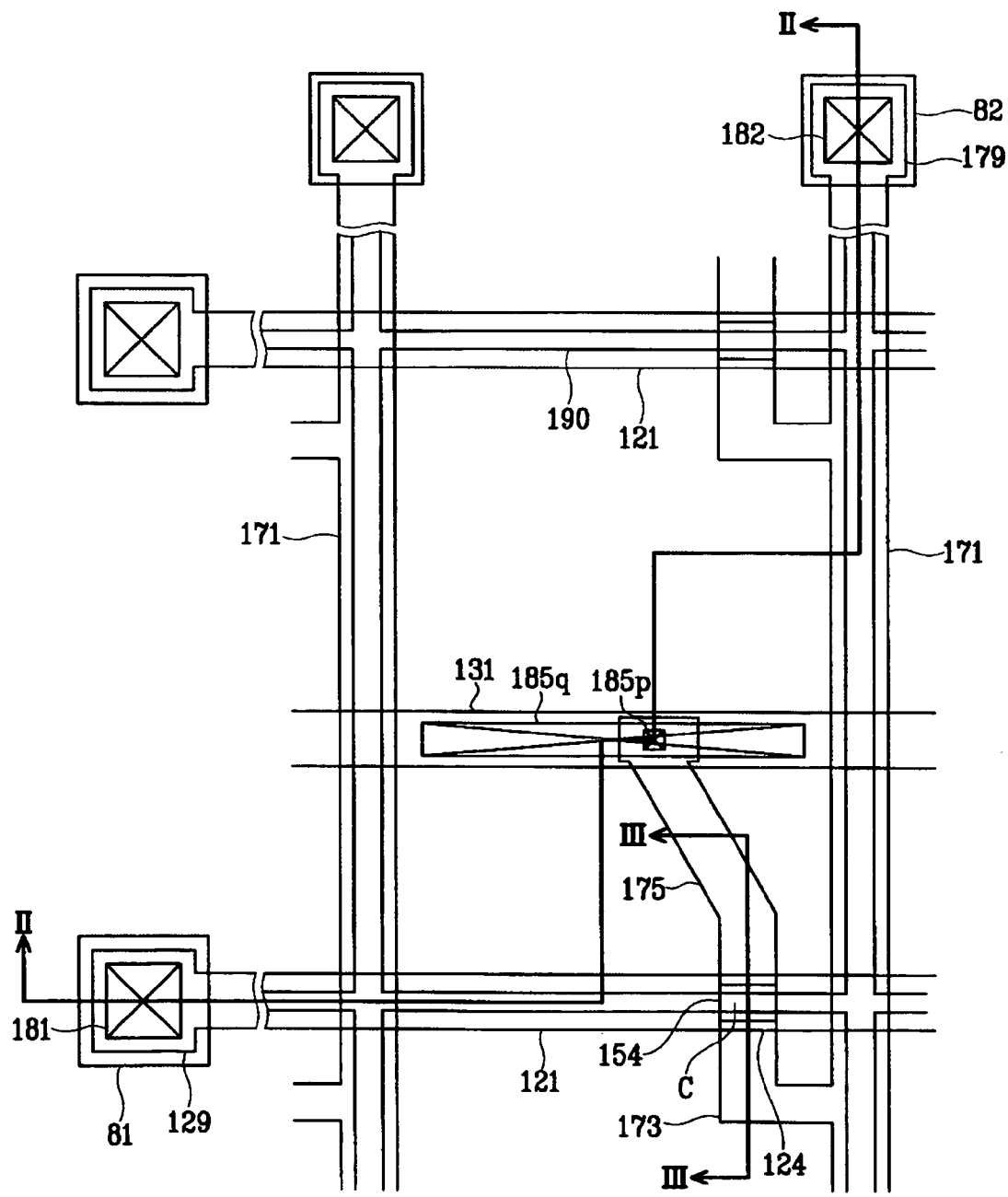
FIG. 1 is a layout view of a TFT array panel for an LCD according to an embodiment of the present invention.

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a TFT array panel for an LCD will be described in detail with reference to FIGS. 1 to 3.

Figure 2:
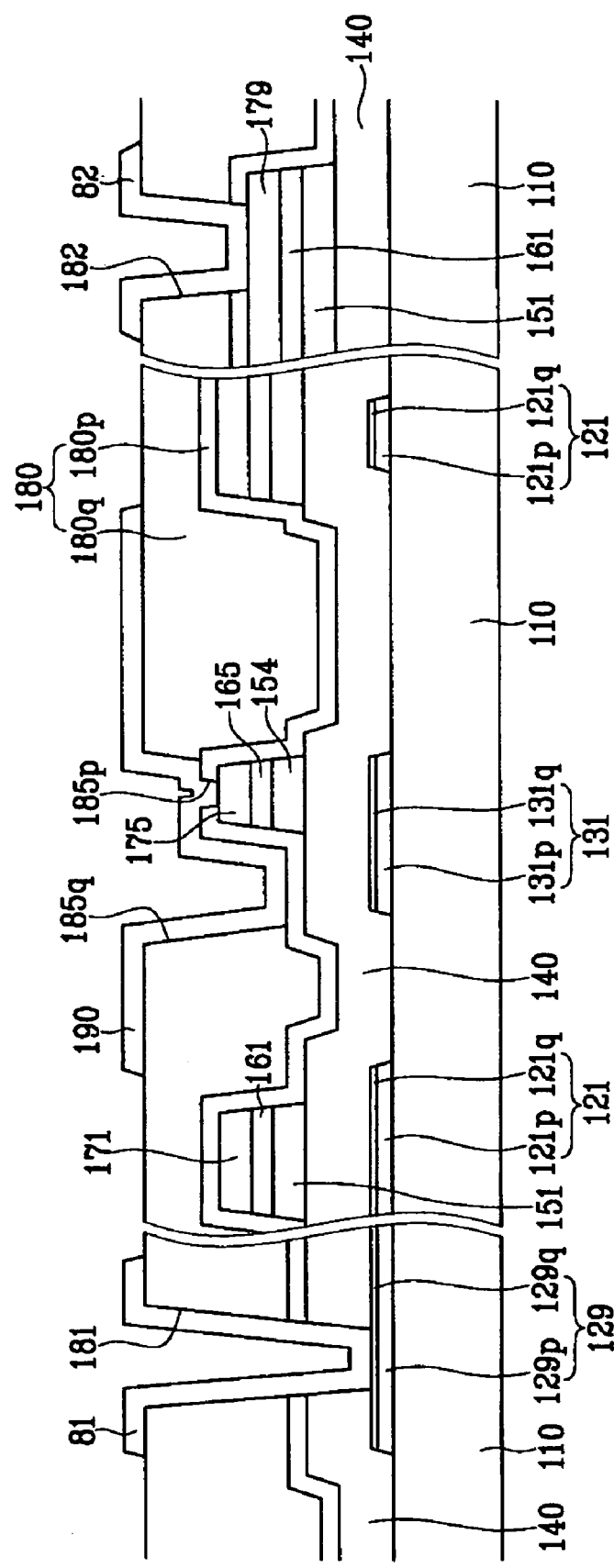
FIGS. 2 and 3 are sectional views of the TFT array panel shown in FIG. 1 taken along the lines II-II and III-III, respectively.
Figure 3:
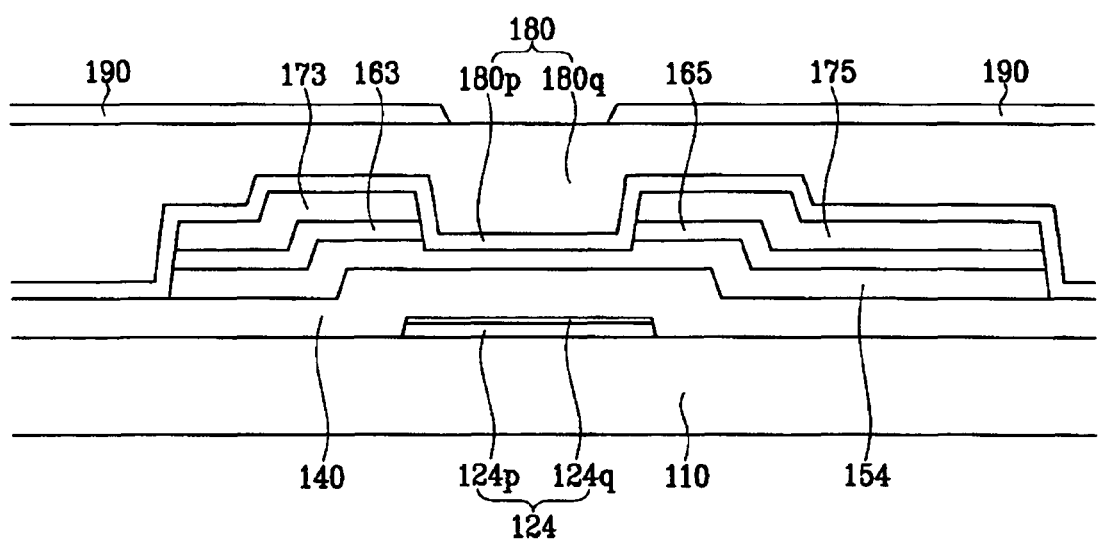

FIG. 1 is a layout view of a TFT array panel for an LCD according to an embodiment of the present invention, and FIGS. 2 and 3 are sectional views of the TFT array panel shown in FIG. 1 taken along the lines II-II and III-III, respectively.

A plurality of gate lines 121 and a plurality of storage electrode lines 131 are formed on an insulating substrate 110, such as transparent glass.

The gate lines 121 extend substantially in a transverse direction, separate from each other, and transmit gate signals. Each gate line 121 includes a plurality of projections forming a plurality of gate electrodes 124, and an end portion 129 having a large area for contact with another layer or an external driving circuit. The gate lines 121 may extend to be connected to a driving circuit that may be integrated on the insulating substrate 110.

Each of the storage electrode lines 131, which are separated from the gate lines 121, extend substantially in the transverse direction and are disposed between two adjacent gate lines 121. The storage electrode lines 131 are supplied with a predetermined voltage such as the common voltage of the other panel (not shown).

The gate lines 121 and the storage electrode lines 131 are preferably made of an Al-containing metal such as Al or an Al alloy, a Ag-containing metal such as Ag or an Ag alloy, a Cu-containing metal such as Cu or a Cu alloy, a Mo-containing metal such as Mo or a Mo alloy, a Cr-containing metal such as Cr or a Cr alloy, a Ti-containing metal such as Ti or a Ti alloy, or a Ta-containing metal such as Ta or a Ta alloy. As shown in FIG. 2, the gate lines 121 include two films having different physical characteristics, i.e., a lower film 121$p$ and an upper film 121$q$. The upper film 121$q$ is preferably made of a low resistivity metal including an Al-containing metal, such as Al or an Al alloy, for reducing signal delay or voltage drop in the gate lines 121, and has a thickness in the range of 1,000-3,000 Å. On the other hand, the lower film 121$p$ is preferably made of a material such as Cr, Mo, and/or a Mo alloy, which has good physical, chemical, and electrical contact characteristics with other materials such as indium tin oxide (ITO) and indium zinc oxide (IZO), and has a thickness in the range of 100-1,000 Å. A good exemplary combination of the lower film material and the upper film material is Mo and an Al—Nd alloy, and their positions may be exchangeable. In FIGS. 2 and 3, the lower and upper films of the gate electrodes 124 are indicated by reference numerals 124$p$ and 124$q$, respectively; the lower and upper films of the end portions 129 are indicated by reference numerals 129$p$ and 129$q$, respectively; and the lower and upper films of the storage electrode lines 131 are indicated by reference numerals 131$p$ and 131$q$, respectively. Portions of the upper film 129$q$ of the end portions 129 of the gate lines 121 may be removed to expose the underlying portions of the lower films 129$p$.

In addition, the lateral sides of the upper films 121$q$, 124$q$, 129$q$, and 131$q$, and the lower films 121$p$, 124$p$, 129$p$, and 131$p$ are tapered, and the inclination angle of the lateral sides with respect to a surface of the substrate 110 ranges between about 30-80 degrees.

A gate insulating layer 140 preferably made of silicon nitride (SiNx) is formed on the gate lines 121.

A plurality of semiconductor stripes 151, preferably made of hydrogenated amorphous silicon (abbreviated "a-Si"), are formed on the gate insulating layer 140. Each semiconductor stripe 151 extends substantially in a longitudinal direction and has a plurality of projections 154 branched out toward the gate electrodes 124.

A plurality of ohmic contact stripes and islands 161 and 165, preferably made of silicide or n+ hydrogenated a-Si heavily doped with N-type impurities, are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30-80 degrees.

A plurality of data lines 171 and a plurality of drain electrodes 175 are formed on the ohmic contacts 161 and 165.

The data lines 171 for transmitting data voltages extend substantially in the longitudinal direction and intersect the gate lines 121 and the storage electrode lines 131. Each data line 171 has an end portion 179 having a large area for contact with another layer or an external device.

Each drain electrode 175 includes an end portion having a large area for contact with another layer and another end portion disposed on a gate electrode 124 and corresponding to the source electrode 173. The drain electrodes 175 are extended over the storage electrode lines 131 and overlap portions of the storage electrode lines 131.

A plurality of branches of each data line 171 that project toward the drain electrodes 175 form a plurality of source electrodes 173. Each of pairs of a source electrode 173 and a drain electrode 175 are separated from each other and are opposite to each other with respect to a gate electrode 124. A gate electrode 124, a source electrode 173, and a drain electrode 175, along with a projection 154 of a semiconductor stripe 151, form a TFT having a channel formed in the projection 154 disposed between the source electrode 173 and the drain electrode 175.

The data lines 171 and drain electrodes 175 are also preferably made of an Al-containing metal such as Al or an Al alloy, a Ag-containing metal such as Ag or an Ag alloy, a Cu-containing metal such as Cu or a Cu alloy, a Mo-containing metal such as Mo or a Mo alloy, a Cr-containing metal such as Cr or a Cr alloy, a Ti-containing metal such as Ti or a Ti alloy, or a Ta-containing metal such as Ta or a Ta alloy, and may have a single-layered or multi-layered structure. A good example of the combination is a lower Mo film, an intermediate Al film, and an upper Mo film as well as the above-described combinations of a lower film and an upper film as in the gate lines 121.

Like the gate lines 121, the data lines 171 and drain electrodes 175 have tapered lateral sides, and the inclination angles thereof range between about 30-80 degrees.

The ohmic contacts 161 and 165 are interposed between the underlying semiconductor stripes 151 and the overlying data lines 171, and between the underlying projections 154 and the overlying drain electrodes 175, respectively, and reduce the contact resistance therebetween. Also, the semiconductor stripes 151 of the TFT array panel according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD).

The passivation layer 180 has a double-layered structure including a lower passivation layer 180$p$ and an upper passivation layer 180$q$. The lower passivation layer 180$p$ is preferably made of silicon nitride or silicon oxide and is formed on the data lines 171, the drain electrodes 175, and the exposed portions of the semiconductor stripes 151. The upper passivation layer 180$q$ has a good flatness characteristic and is preferably made of organic material. The lower passivation layer 180$p$ prevents the exposed portions of the semiconductor stripes 151 from contacting the organic material, and the upper passivation layer 180$q$ may be a color filter representing one of the primary colors such as red, green, and blue.

The passivation layer 180 has a plurality of contact holes 185$p$ and 182 exposing the end portions of the drain electrodes 175, and end portions 179 of the data lines 171, respectively. The passivation layer 180 and the gate insulating layer 140 have a plurality of contact holes 181 exposing end portions 129 of the gate lines 121. Here, the contact holes 185$p$ exposing the end portions of the drain electrodes 175 are only disposed in the lower passivation layer 180$p$, and the upper passivation layer 180$q$ has a plurality of openings 185$q$ exposing the lower passivation layer 180$p$ on the greater part of the storage electrode lines 131. The contact holes 185$p$ exposing the end portions of the drain electrodes 175 and the vertical boundaries of the end portions of the drain electrodes 175 are located at the inner portion of the openings 185q. It is preferable that the area of the drain electrodes 175, in particular the area of the drain electrodes 175 over the storage electrode lines 131, be reduced or minimized, to minimize remaining amorphous silicon under the drain electrodes 175.

A plurality of pixel electrodes 190 and a plurality of contact assistants 81 and 82, which are preferably made of IZO or ITO, are formed on the passivation layer 180.

The pixel electrodes 190 are physically and electrically connected to the drain electrodes 175 through the contact holes 185 such that the pixel electrodes 190 receive the data voltages from the drain electrodes 175.

Referring back to FIG. 2, the pixel electrodes 190 supplied with the data voltages generate electric fields in cooperation with the common electrode on the other panel (not shown), which reorient liquid crystal molecules in a liquid crystal layer disposed therebetween.

As described above, a pixel electrode 190 and a common electrode form a liquid crystal capacitor, which stores applied voltages after turn-off of the TFT Q. An additional capacitor called a "storage capacitor," which is connected in parallel to the liquid crystal capacitor, is provided for enhancing the voltage storing capacity. The storage capacitors are implemented by overlapping the pixel electrodes 190 with the gate lines 121 adjacent thereto (called "previous gate lines") or the storage electrode lines 131.

In the embodiment according to the present invention, because the gate insulating layer 140 and the lower passivation layer 180p exposed through the opening as a dielectric of the storage capacitor is only disposed between the pixel electrode 190 and the storage electrode lines 131, a uniform storage capacitance may be provided, and the storage capacitance may be maximized in the optimized area. Accordingly, a flicker on the screen, as well as an afterimage, may be prevented, thereby enhancing the characteristics of the LCD.

Alternatively, the opening 185q of the upper passivation layer 180q, which exposes the lower passivation layer 180p, may be disposed on the previous gate lines 121 by overlapping the pixel electrodes 190 with the gate lines 121 adjacent thereto to form a storage capacitor. At this time, the gate lines 121 may be expansions overlapping the pixel electrodes 190.

In a further alternative, when the upper passivation layer 180q includes the color filters, the color filters may be removed in a pad region, in which the end portions 129 and 179 are disposed.

Optionally, the pixel electrodes 190 may overlap the gate lines 121 and the data lines 171 to increase an aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 are not requisites, but are preferred to protect the exposed portions 129 and 179 and to complement the adhesiveness of the exposed portions 129 and 179 with external devices.

According to another embodiment of the present invention, the pixel electrodes 190 are made of a transparent conductive polymer. For a reflective LCD, the pixel electrodes 190 are made of an opaque reflective metal. In this case, the contact assistants 81 and 82 may be made of a material, such as IZO or ITO, different from the pixel electrodes 190.

A method of manufacturing the TFT array panel shown in FIGS. 1 to 3 according to an embodiment of the present invention will be now described in detail with reference to FIGS. 4 to 11B as well as FIGS. 1 to 3.

Figure 4:
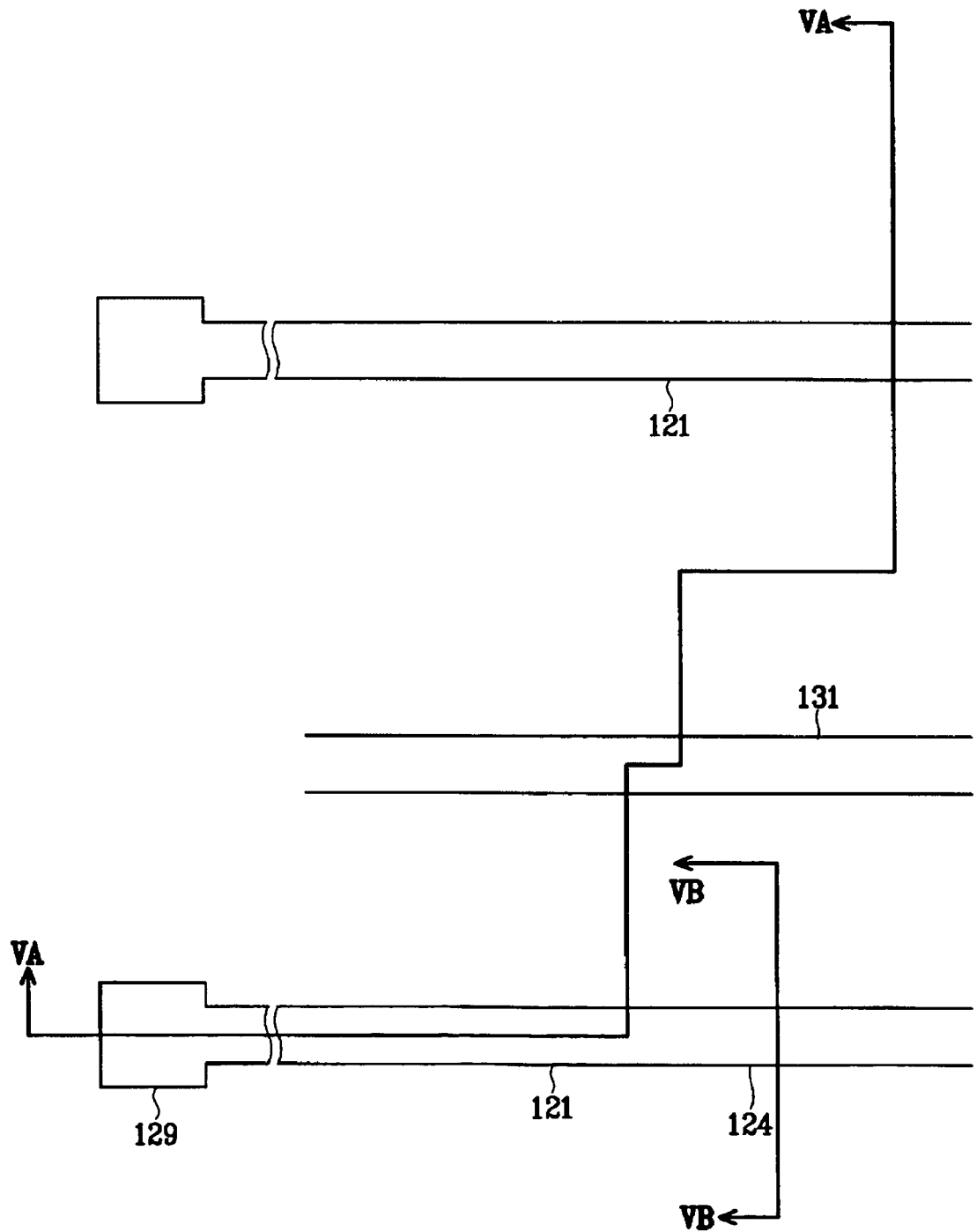
FIG. 4 is a layout view of the TFT array panel shown in FIGS. 1-3 in the first step of a manufacturing method thereof according to an embodiment of the present invention.
Figure 5A:
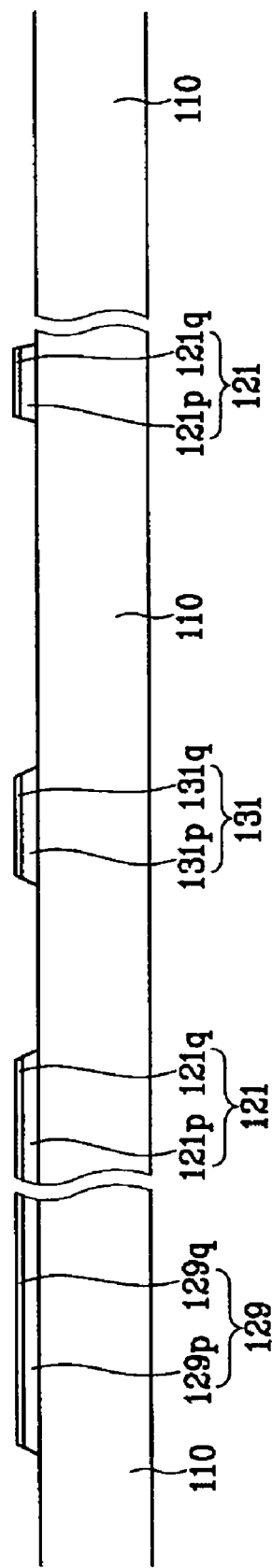
FIGS. 5A and 5B are sectional views of the TFT array panel shown in FIG. 4 taken along the lines VA-VA and VB-VB, respectively.
Figure 5B:
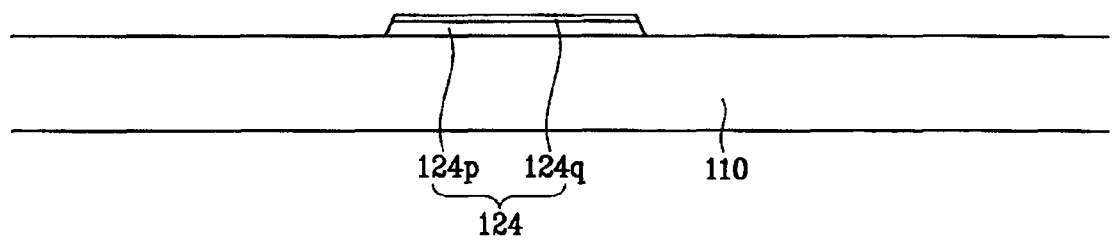
Figure 6A:
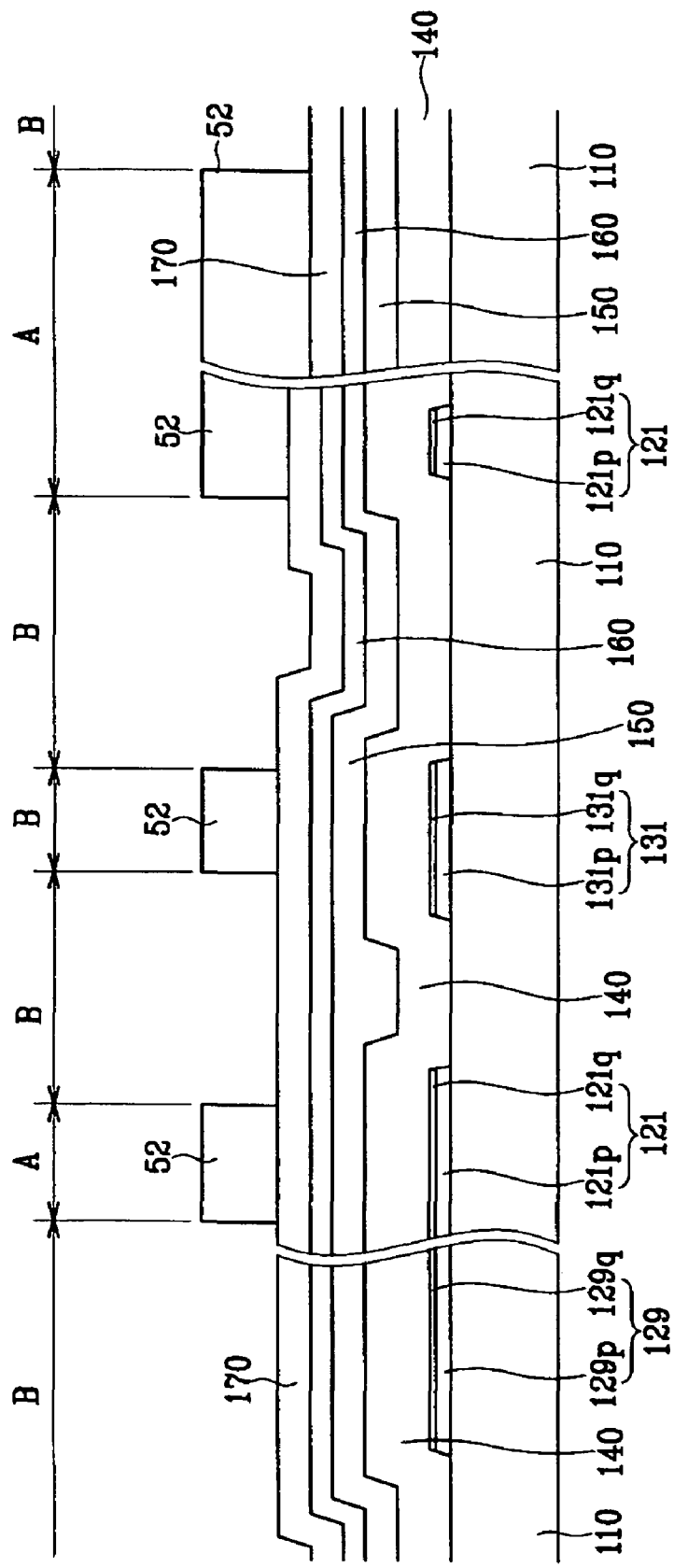
FIGS. 6A and 6B are sectional views of the TFT array panel shown in FIG. 4 taken along the lines VA-VA and VB-VB, respectively, and illustrate the step following the step shown in FIGS. 5A and 5B.
Figure 6B:
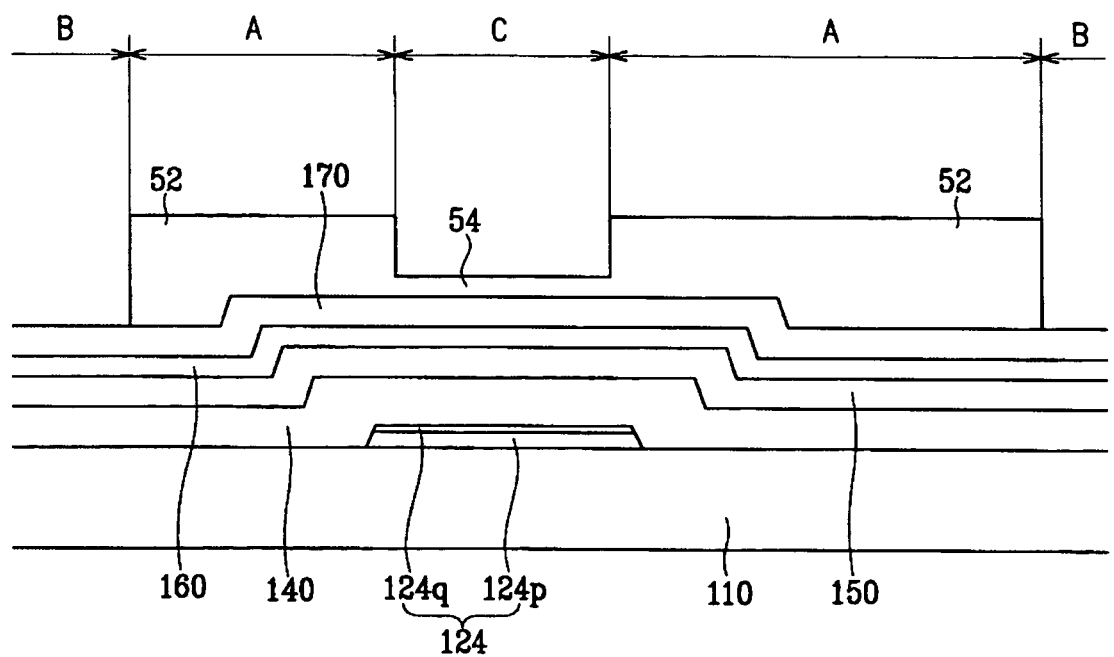
Figure 7A:
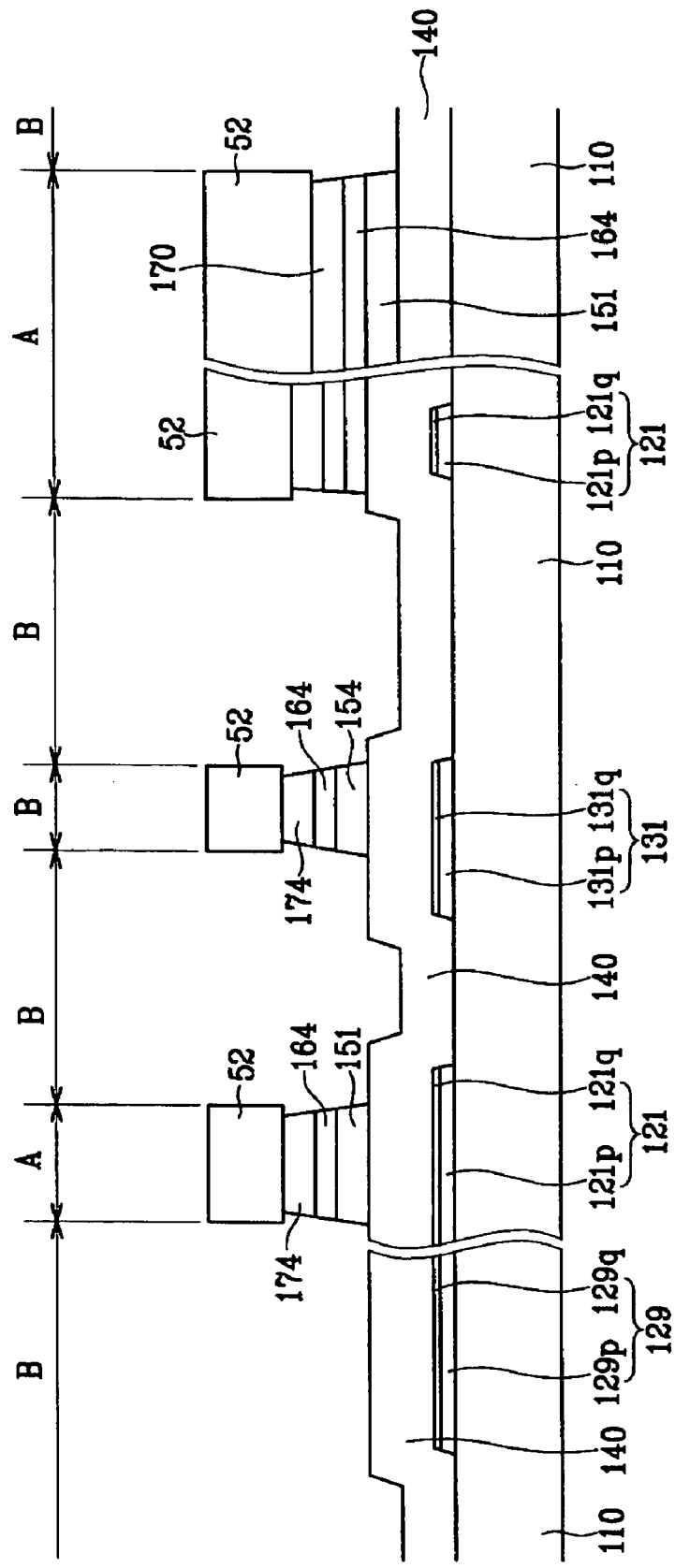
FIGS. 7A and 7B are sectional views of the TFT array panel shown in FIG. 4 taken along the lines VA-VA and VB-VB, respectively, and illustrate the step following the step shown in FIGS. 6A and 6B.
Figure 7B:
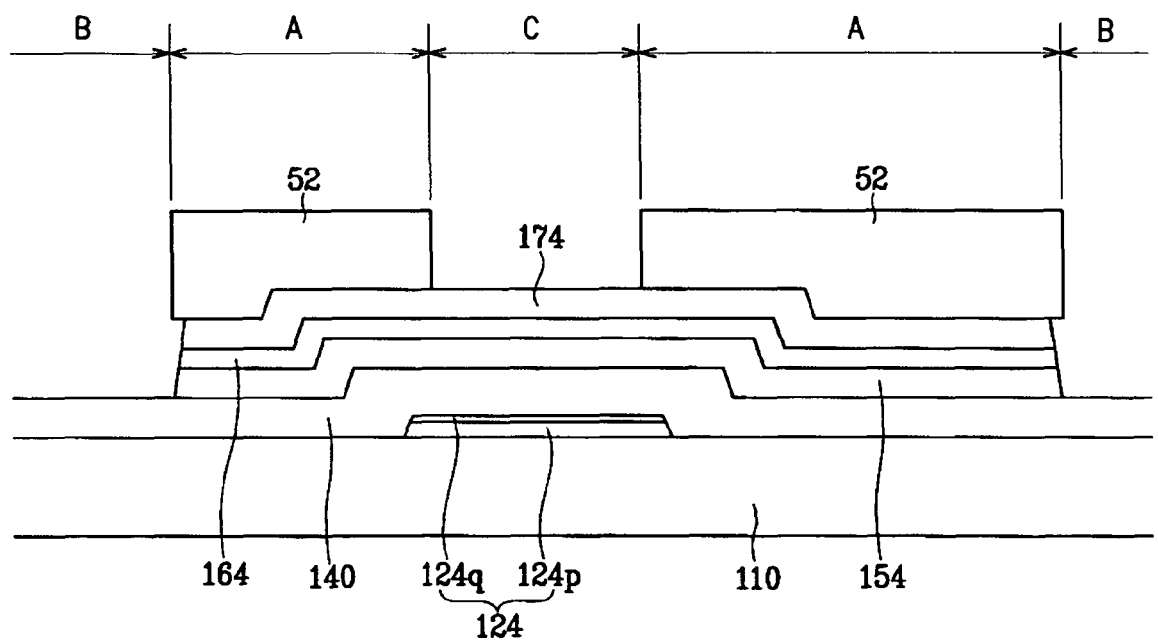
Figure 8:
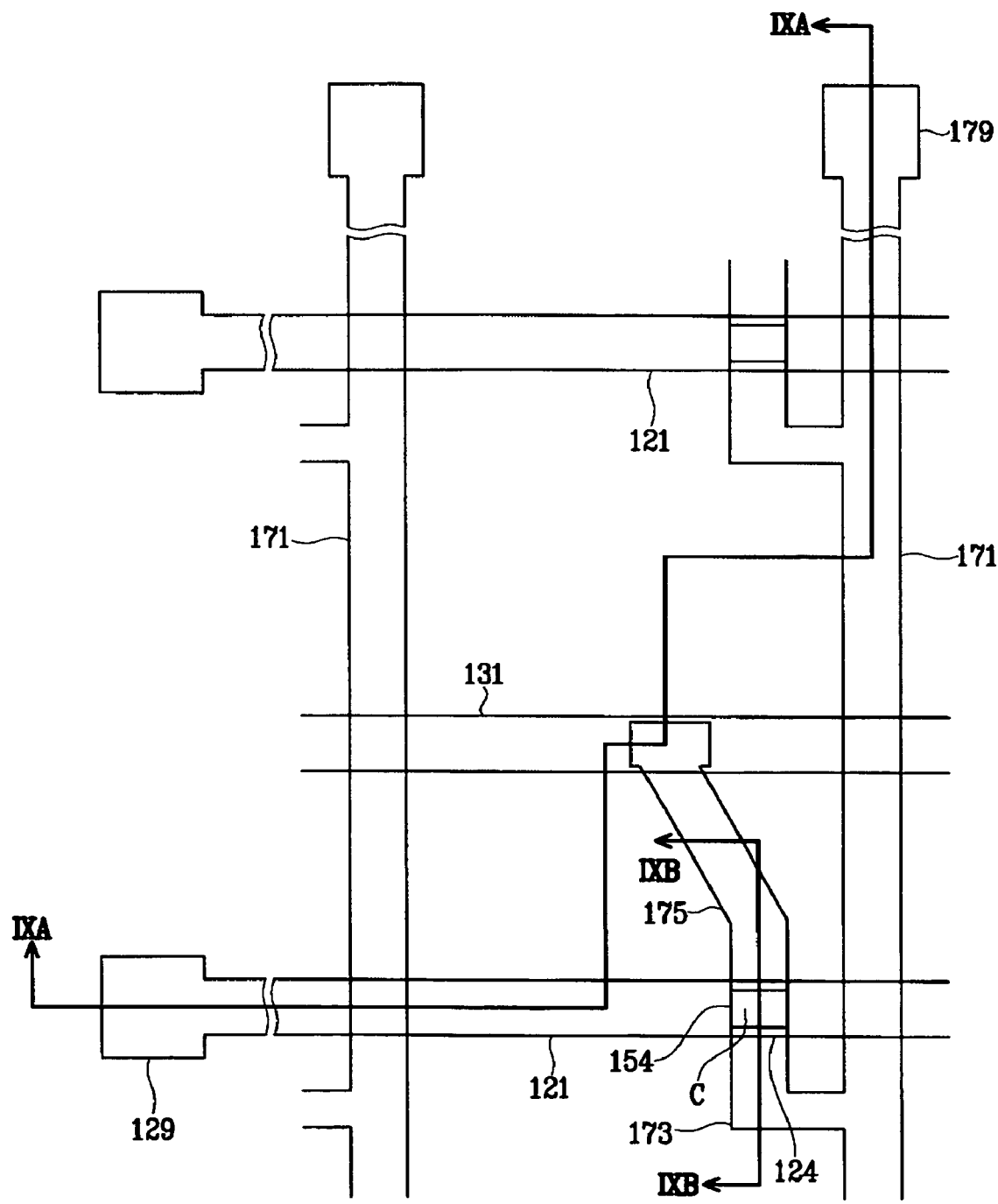
FIG. 8 is a layout view of the TFT array panel in the step following the step shown in FIGS. 7A and 7B.
Figure 9A:
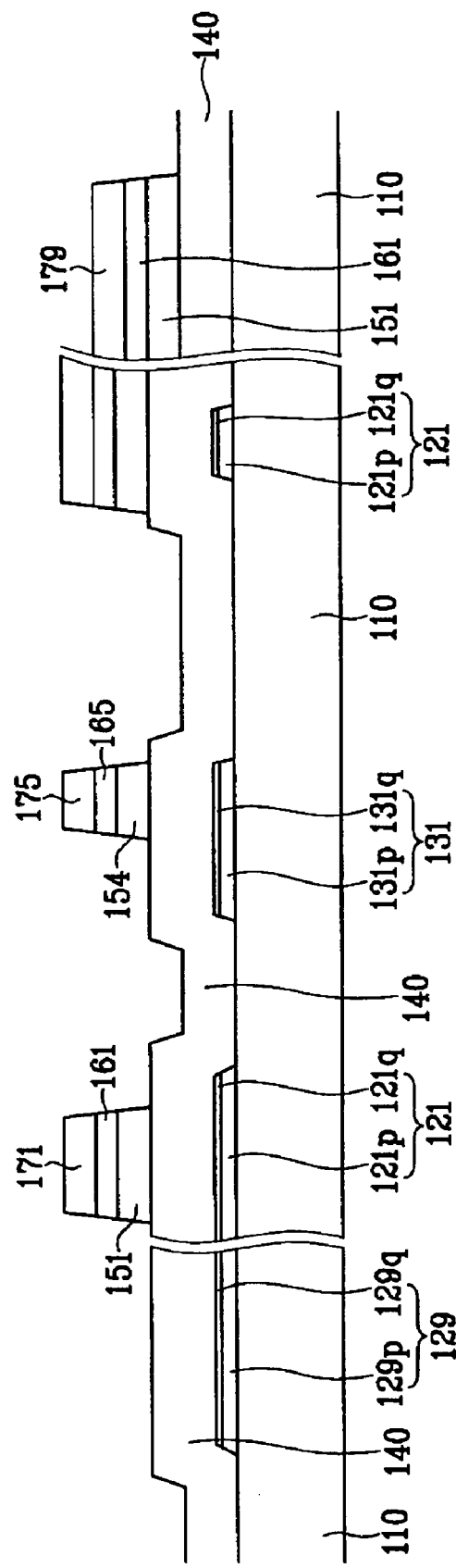
FIGS. 9A and 9B are sectional views of the TFT array panel shown in FIG. 8 taken along the lines IXA-IXA and IXB-IXB, respectively.
Figure 9B:
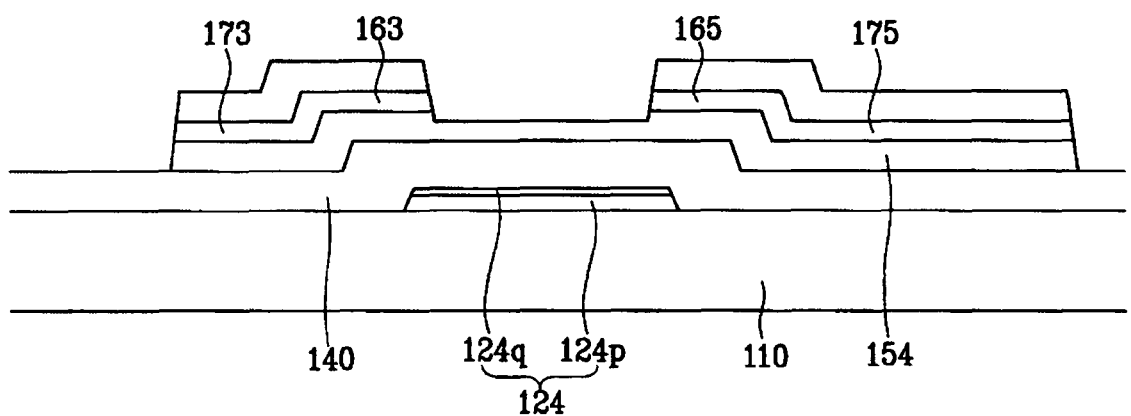
Figure 10:
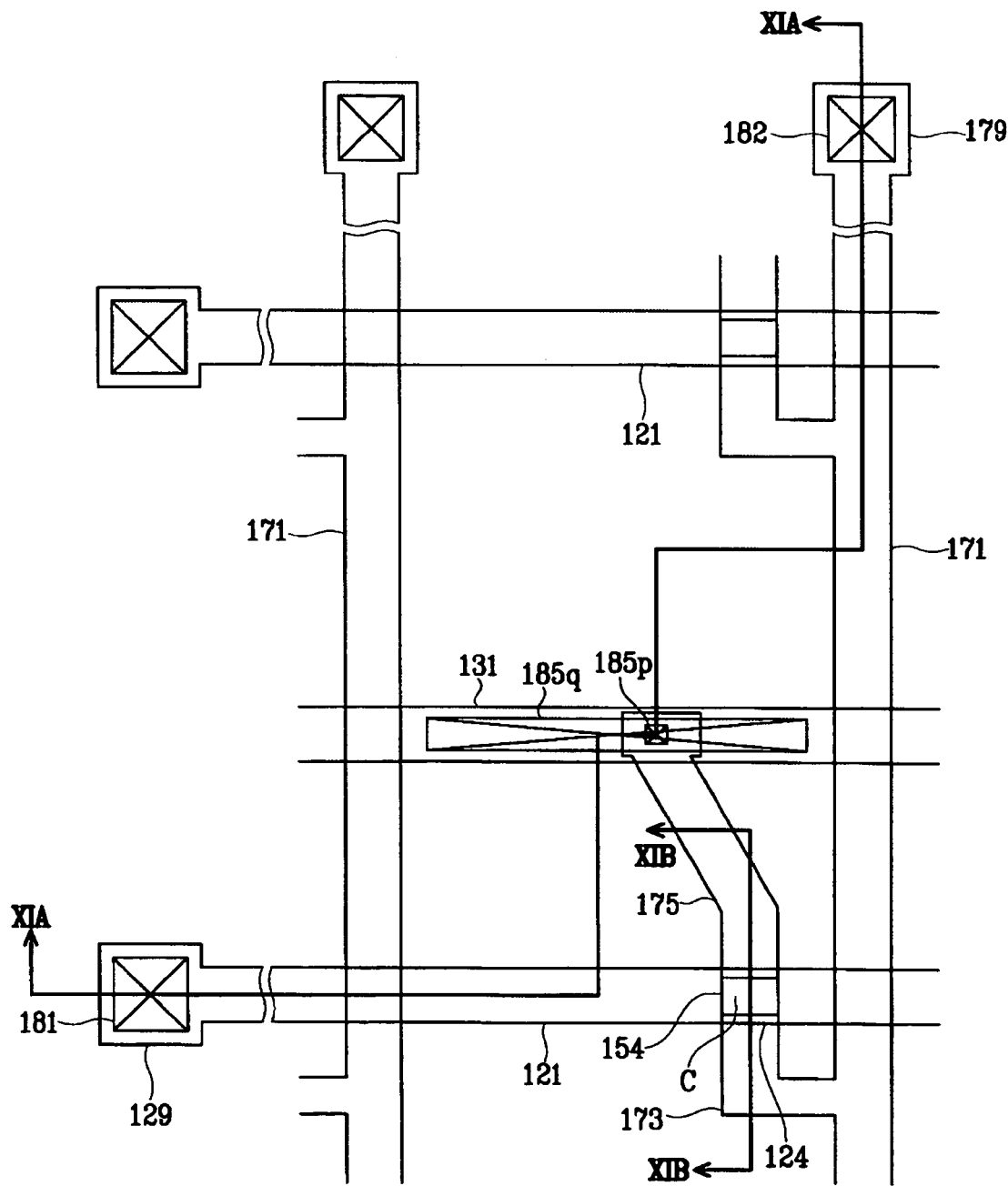
FIG. 10 is a layout view of the TFT array panel in the step following the step shown in FIGS. 9A and 9B.
Figure 11A:
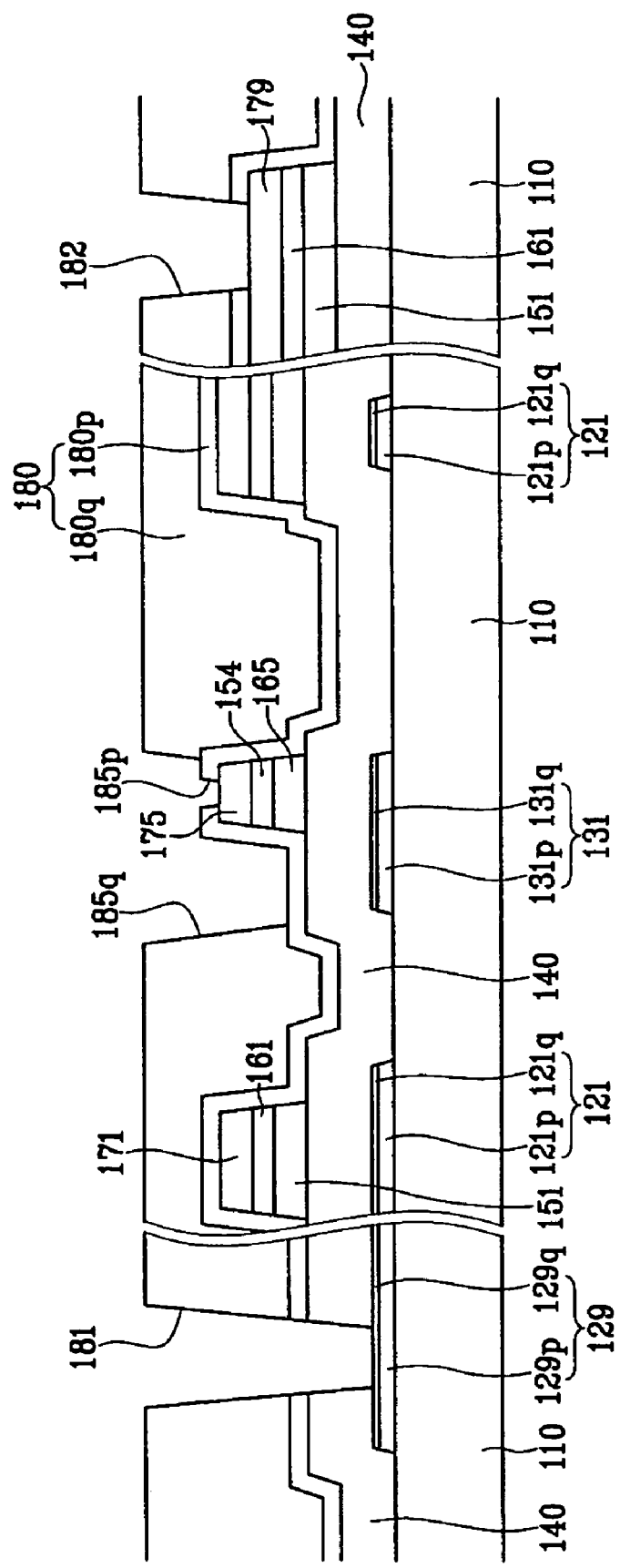
FIGS. 11A and 11B are sectional views of the TFT array panel shown in FIG. 10 taken along the lines XIA-XIA and XIB-XIB, respectively.
Figure 11B:
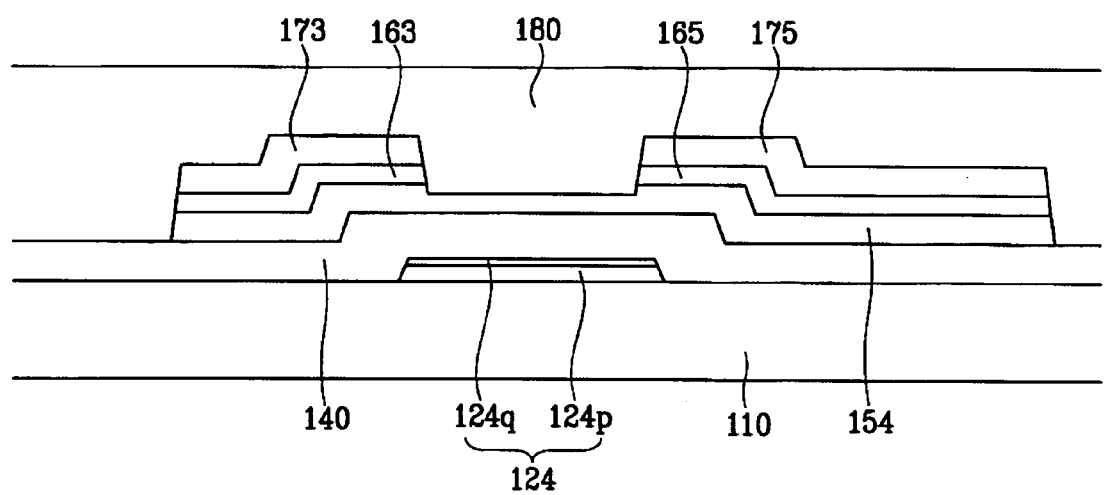

FIG. 4 is a layout view of the TFT array panel shown in FIGS. 1-3, in the first step of a manufacturing method thereof according to an embodiment of the present invention; FIGS. 5A and 5B are sectional views of the TFT array panel shown in FIG. 4 taken along the lines VA-VA and VB-VB, respectively; FIGS. 6A and 6B are sectional views of the TFT array panel shown in FIG. 4 taken along the lines VA-VA and VB-VB, respectively, and illustrate the step following the step shown in FIGS. 5A and 5B; FIGS. 7A and 7B are sectional views of the TFT array panel shown in FIG. 4 taken along the lines VA-VA and VB-VB, respectively, and illustrate the step following the step shown in FIGS. 6A and 6B; FIG. 8 is a layout view of the TFT array panel in the step following the step shown in FIGS. 7A and 7B; FIGS. 9A and 9B are sectional views of the TFT array panel shown in FIG. 8 taken along the lines IXA-IXA and IXB-IXB, respectively; FIG. 10 is a layout view of the TFT array panel in the step following the step shown in FIGS. 9A and 9B; and FIGS. 11A and 11B are sectional views of the TFT array panel shown in FIG. 10 taken along the lines XIA-XIA and XIB-XIB, respectively.

Two conductive films, a lower conductive film and an upper conductive film, are sputtered in sequence on an insulating substrate 110 made of a material such as transparent glass. The lower conductive film is preferably made of a material such as Al or an Al alloy, and preferably has a thickness in the range between about 1,000-3,000 Å. The upper conductive film is preferably made of Mo or a Mo alloy, and preferably has a thickness in the range between about 500-1,000 Å.

Referring to FIGS. 4, 5A, and 5B, after forming a photoresist on the upper conductive film, the upper conductive film and the lower conductive film are patterned in sequence using the photoresist as an etch mask to form a plurality of gate lines 121 including a plurality of gate electrodes 124, and a plurality of storage electrode lines 131, and the removal of the photoresist follows.

The patterning of the upper films 121q and 131q and the lower films 121p and 131p is performed by wet etching, in one example using an Al etchant including $CH_3COOH$, $HNO_3$, $H_3PO_4$, and $H_2O$, which can etch both Al and Mo with inclined etch profiles.

Referring to FIGS. 6A and 6B, a gate insulating layer 140, an intrinsic a-Si layer 150, and a extrinsic a-Si layer 160 are sequentially deposited by CVD, such that the layers 140, 150, and 160 have a thickness of about 1,500-5,000 Å, about 500-2,000 Å, and about 300-600 Å, respectively. A conductive layer 170 is deposited by sputtering, and a photoresist with a thickness of about 1-2 microns is coated on the conductive layer 170. The photoresist is exposed to light through an exposure mask (not shown) and developed to form a photoresist film 52, 54.

The developed photoresist film 52, 54 has a position-dependent thickness. The photoresist shown in FIGS. 6A and 6B includes a plurality of first to third portions with decreasing thicknesses. The first portions located on areas A and the second portions located on areas C are indicated by reference numerals 52 and 54, respectively, and no reference numeral is assigned to the third portions located on areas B since they have substantially zero thickness so as to expose underlying portions of the conductive layer 170. The thickness ratio of the second portions 54 to the first portions 52 is adjusted depending upon the process conditions in the subsequent process steps. It is preferable that the thickness of the second portions 54 is equal to or less than half of the thickness of the first portions 52, and in particular, equal to or less than 4,000 Å. The areas A correspond to the data lines 171 and the drain electrode 175, the areas C correspond to the portions between the source electrode 173 and the drain electrode 175, and to the storage electrode lines 131, and the areas B are the remaining areas except for the areas A and C.

The position-dependent thickness of the photoresist is obtained by several techniques, for example, by providing translucent areas on the exposure mask as well as transparent areas and light blocking opaque areas. The translucent areas may have a slit pattern, a lattice pattern, or be a thin film(s) with intermediate transmittance or intermediate thickness. When using a slit pattern, it is preferable that the width of the slits or the distance between the slits is smaller than the resolution of a light exposer used for the photolithography.

The different thickness of the photoresist 52, 54 allows selective etching of the underlying layers under suitable process conditions. Therefore, a plurality of data lines 171 including a plurality of source electrodes 173, and a plurality of drain electrodes 175, as well as a plurality of ohmic contact stripes 161 including a plurality of projections 163, a plurality of ohmic contact islands 165, and a plurality of semiconductor stripes 151 including a plurality of projections 154 and semiconductor islands 157 are obtained as shown in FIGS. 8, 9A, and 9B by a series of etching steps.

For descriptive purposes, portions of the conductive layer 170, the extrinsic a-Si layer 160, and the intrinsic a-Si layer 150 on the areas A are called first portions, portions of the conductive layer 170, the extrinsic a-Si layer 160, and the intrinsic a-Si layer 150 on the areas C are called second portions, and portions of the conductive layer 170, the extrinsic a-Si layer 160, and the intrinsic a-Si layer 150 on the areas B are called third portions.

An exemplary sequence of forming such a structure is as follows:

(1) Removal of third portions of the conductive layer 170, the extrinsic a-Si layer 160, and the intrinsic a-Si layer 150 on the areas B;

(2) Removal of the second portions 54 of the photoresist on the channel areas C;

(3) Removal of the second portions of the conductive layer 170 and the extrinsic a-Si layer 160 on the channel areas C; and (4) Removal of the first portions 52 of the photoresist.

Another exemplary sequence is as follows:

(1) Removal of the third portions of the conductive layer 170;

(2) Removal of the second portions 54 of the photoresist;

(3) Removal of the third portions of the extrinsic a-Si layer 160 and the intrinsic a-Si layer 150;

(4) Removal of the second portions of the conductive layer 170;

(5) Removal of the first portions 52 of the photoresist; and (6) Removal of the second portions of the extrinsic a-Si layer 160.

The second example is now described in detail.

Referring to FIGS. 7A and 7B, the exposed third portions of the conductive layer 170 on the remaining areas B are removed by wet etching or dry etching to expose the underlying third portions of the extrinsic a-Si layer 160. The Al-containing metal film is preferably wet etched, while the Mo-containing metal films can be etched both by dry etching and wet etching. The double layer including Al and Mo may be simultaneously etched under the same etching condition.

Next, the third portions of the extrinsic a-Si layer 160 and the intrinsic a-Si layer 150 on the areas B are removed, preferably by dry etching, and the second portions 54 of the photoresist are removed to expose the second portions of the conductors 174. The removal of the second portions 54 of the photoresist is performed either simultaneously with, or independently from, the removal of the third portions of the extrinsic a-Si layer 160 and of the intrinsic a-Si layer 150. Residue of the second portions 54 of the photoresist remaining on the areas C is removed by ashing.

The semiconductor stripes 151 are completed in this step, and reference numerals 164 and 167 indicate portions of the extrinsic a-Si layer 160 including the ohmic contact stripes and islands 161 and 165 connected to each other and disposed on the storage electrode lines 131, which are called "extrinsic semiconductor stripes."

Reference numeral 174 indicates conductors of the conductive layer 170, including the data lines 171 and the drain electrode 175 connected to each other. The conductors 174 are over-etched under the photoresist film 52, 54, thereby making an under-cut structure.

Referring to FIGS. 8, 9A, and 9B, the second portions of the conductors 174 and the extrinsic a-Si stripes 164 on the areas C, as well as the first portion 52 of the photoresist, are removed.

As shown in FIG. 9B, top portions of the projections 154 of the intrinsic semiconductor stripes 151 on the areas C may be removed to reduce thickness, and the first portions 52 of the photoresist are etched to a predetermined thickness.

In this way, each conductor 174 is divided into a data line 171 and a plurality of drain electrodes 175 to be completed, and each extrinsic semiconductor stripe 164 is divided into an ohmic contact stripe 161 and a plurality of ohmic contact islands 165 to be completed.

Referring to FIGS. 10, 11A, and 11B, a lower passivation layer 180$p$ is deposited by CVD of a silicon nitride, and an upper passivation layer 180$q$ is coated with an acrylic organic insulating material. Thereafter, the passivation layer 180 and the gate insulating layer 140 are photo-etched to form a plurality of contact holes 181, 182, and 185$p$, and openings 185$q$. At this time, the photoresist including the different thicknesses is used as in the formation of the data lines 175 and semiconductor stripes 151 to allow selective etching of the upper passivation layer 180$q$ and the lower passivation layer 180$p$, which have different plane shapes from each other, when using suitable process conditions. When the upper passivation layer 180$q$ includes color filters, the color filters are formed using a separate photolithography process, and the openings 185$q$ exposing the lower passivation layer 180$p$ are formed in the photolithography process for forming the color filters.

Finally, as shown in FIGS. 1-3, a plurality of pixel electrodes 190 and a plurality of contact assistants 81 and 82 are formed on the passivation layer 180 by sputtering, to a thickness of 500-1,500 Å and photo-etching an ITO or IZO layer. The etching of the IZO film may include wet etching using a Cr etchant, such as $HNO_3/(NH_4)_2Ce(NO_3)_6/H_2O$, which does not erode the exposed Al portions of the gate lines 121, the data lines 171, and the drain electrodes 175, through the contact holes 182, 181, and 185.

Since the manufacturing method of the TFT array panel according to an embodiment of the invention simultaneously forms the data lines 171, the drain electrodes 175, the semiconductors 151 and 154, and the ohmic contacts 161 and 165 using only one photolithography process, the manufacturing process is simplified by omitting a photolithography step.

In the manufacturing method according to the present invention, because the gate insulating layer 140 and the lower passivation layer 180$p$ exposed through the opening as a dielectric of the storage capacitor is only disposed between the pixel electrode 190 and the storage electrode lines 131, a uniform storage capacitance may be provided, and the storage capacitance may be maximized in the optimized area. Accordingly, a flicker on the screen, as well as an afterimage, may be prevented, thereby enhancing the characteristics of the LCD.

On the other hand, a wide viewing angle of the LCD can be realized by cutouts in the field-generating electrodes and protrusions on the field-generating electrodes. Since the cutouts and protrusions can determine the tilt directions of the LC molecules, the tilt directions can be distributed in several directions by using the cutouts and the protrusions such that the viewing angle is widened.

An LCD according to another embodiment of the present invention will be described in detail with reference to FIGS. 12-15.

Figure 12:
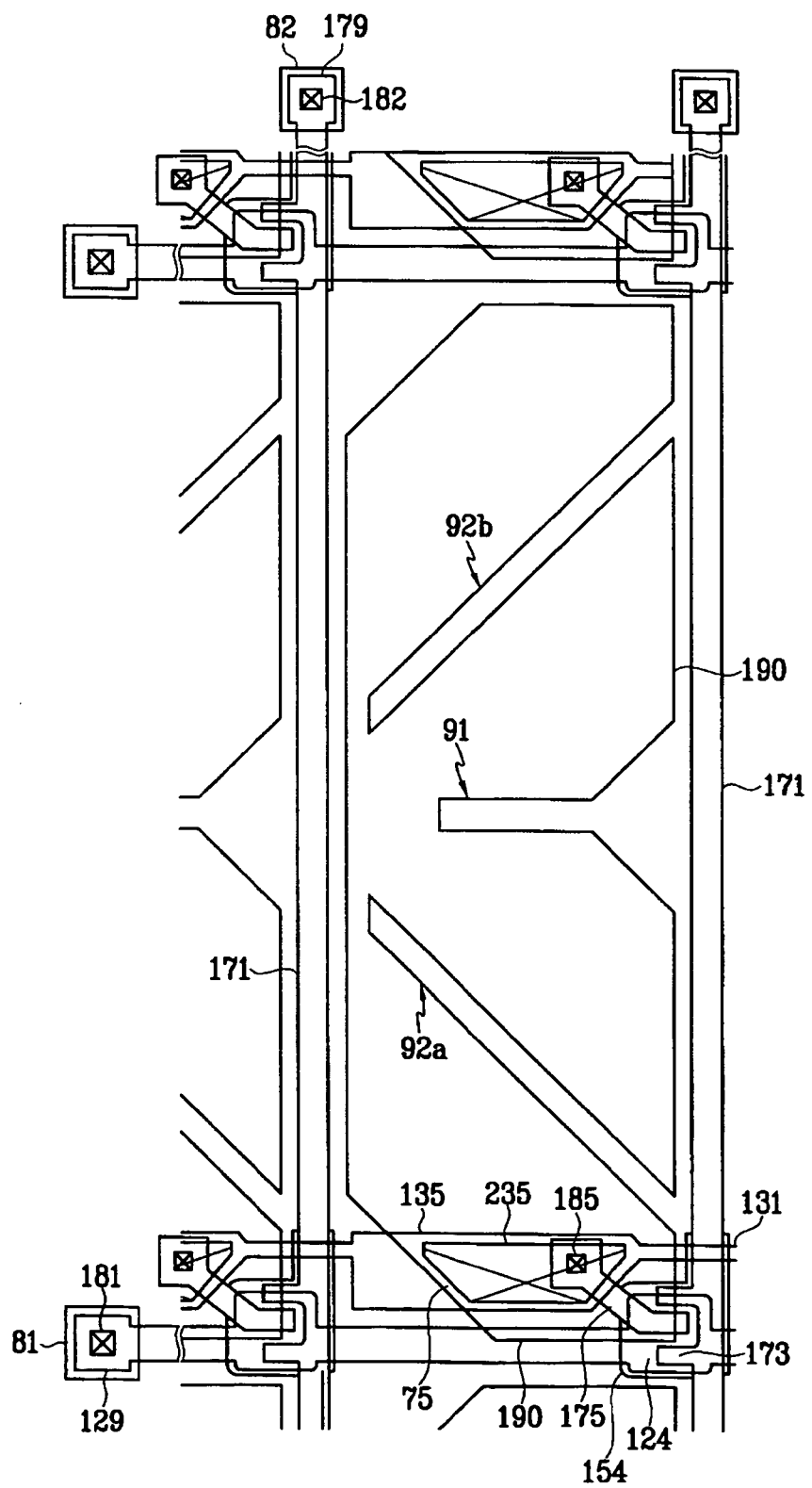
FIG. 12 is a layout view of a TFT array panel of an LCD according to another embodiment of the present invention.
Figure 13:
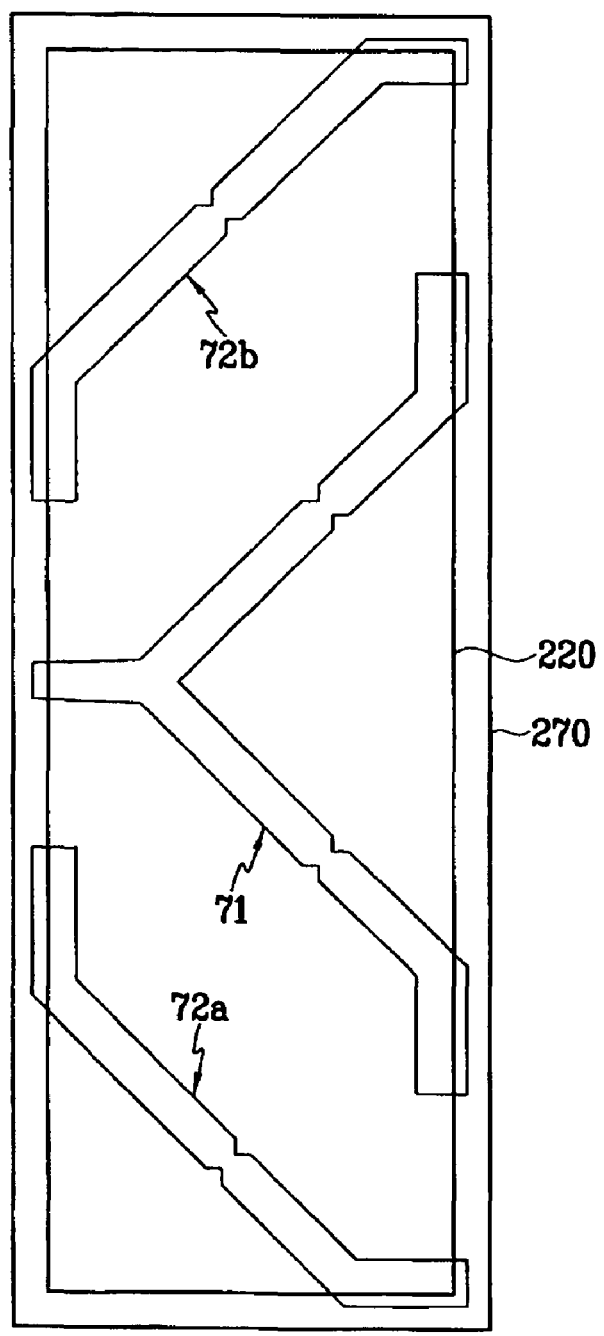
FIG. 13 is a layout view of a common electrode panel of an LCD according to an embodiment of the present invention.
Figure 14:
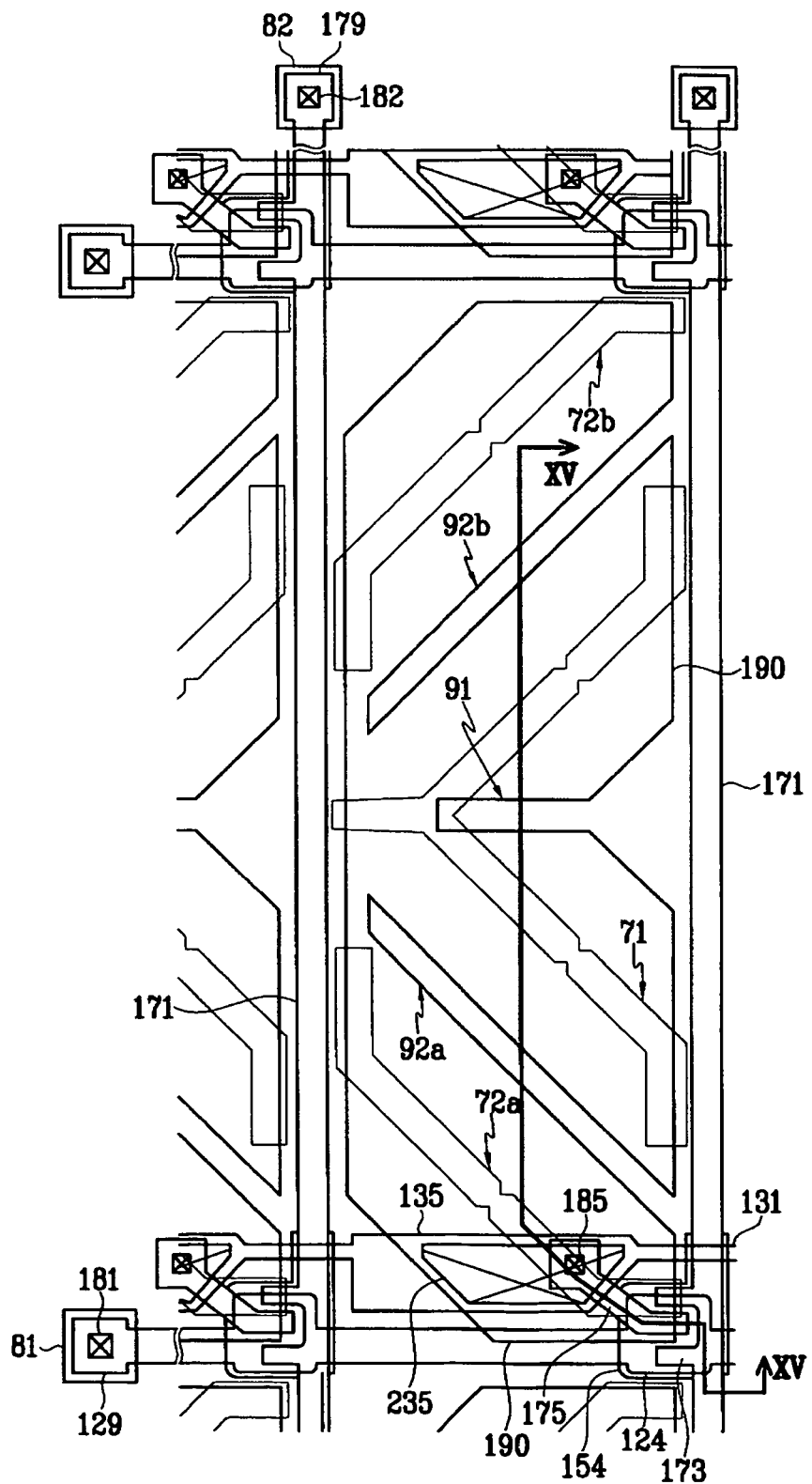
FIG. 14 is a layout view of an LCD including the TFT array panel shown in FIG. 12 and the common electrode panel shown in FIG. 13.
Figure 15:
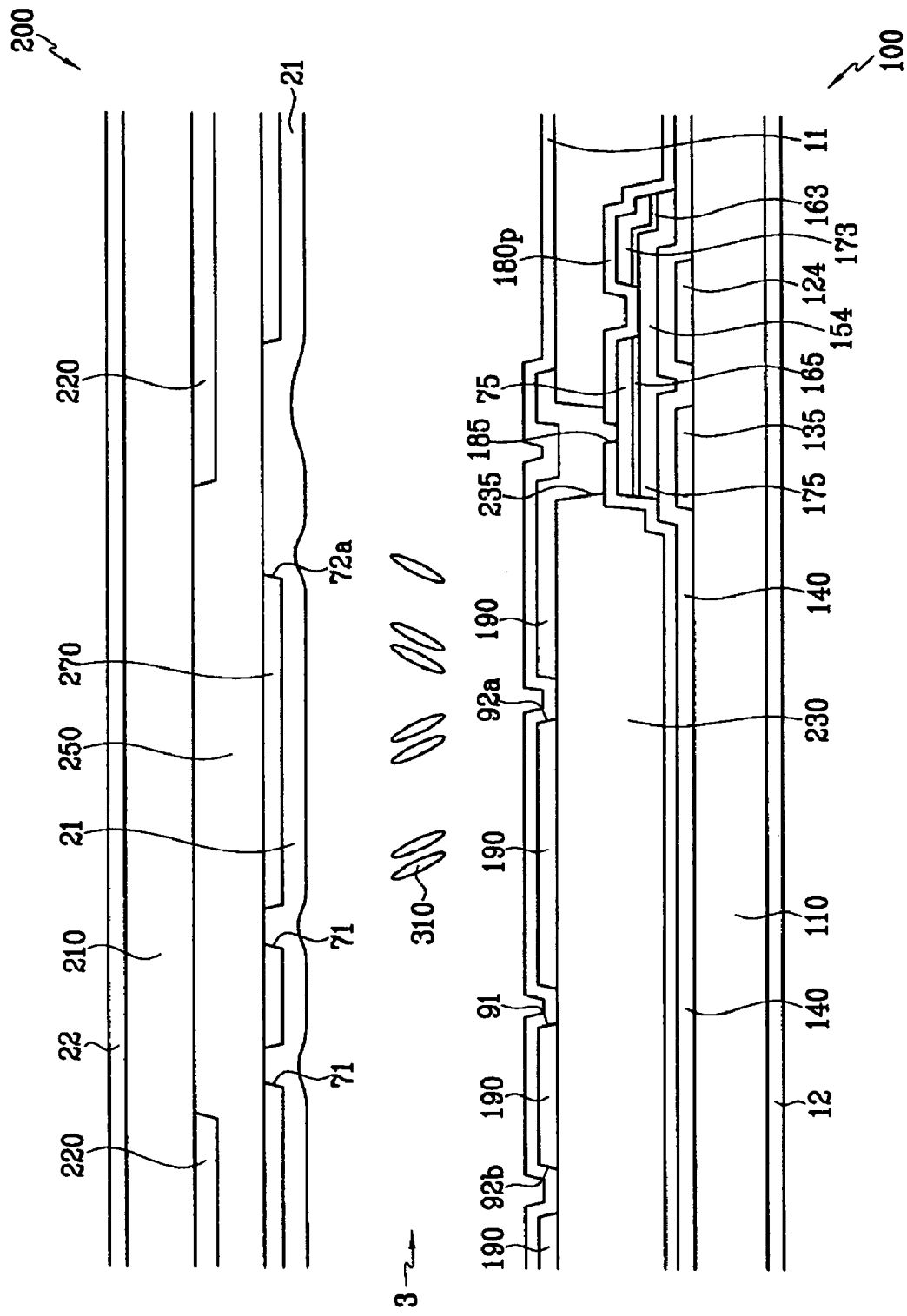
FIG. 15 is a sectional view of the LCD shown in FIG. 14 taken along the line XV-XV.

FIG. 12 is a layout view of a TFT array panel of an LCD according to another embodiment of the present invention; FIG. 13 is a layout view of a common electrode panel of an LCD according to an embodiment of the present invention; FIG. 14 is a layout view of an LCD including the TFT array panel shown in FIG. 12 and the common electrode panel shown in FIG. 13; and FIG. 15 is a sectional view of the LCD shown in FIG. 14 taken along the line XV-XV.

An LCD according to an embodiment of the present invention includes a TFT array panel 100, a common electrode panel 200, and an LC layer 3 interposed between the panels 100 and 200 and containing a plurality of LC molecules 310 aligned substantially vertical to surfaces of the panels 100 and 200.

As shown in FIGS. 12-15, a layered structure of a TFT array panel of an LCD according to this embodiment is almost the same as that shown in FIGS. 1 to 3.

That is, a plurality of gate lines 121 including a plurality of gate electrodes 124 and a plurality of storage electrode lines 131 are formed on a substrate 110, and a gate insulating layer 140, a plurality of semiconductor stripes 151 including a plurality of projections 154 and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 182, 185, and 181 are provided at the passivation layer 180 and/or the gate insulating layer 140, and a plurality of pixel electrodes 190 and a plurality of contact assistants 81 and 82 are formed on the passivation layer 180.

Different from the TFT array panel shown in FIGS. 1 to 3, the TFT array panel according to this embodiment provides a plurality of gate lines 121 including a plurality of projections forming a plurality of gate electrodes 124, and a plurality of storage electrode lines 131 having a plurality of projections forming a plurality of storage electrodes 135.

Each of the drain electrodes 175 extends upward/downward from an end portion and includes an expansion having a large area for contact with another layer, and each of the source electrodes 173 is curved to partly enclose an end portion of the drain electrode 175. The expansion of the drain electrode 175 overlaps the storage electrode 135, and is smaller than the area of the storage electrode 135.

An upper passivation layer is made of a plurality of color filters 230, which are formed on a lower passivation layer 180p, and may represent one of the primary colors, i.e., red, green, and blue. The color filters have a plurality of openings 235 exposing the greater part of the lower passivation layer 180p disposed on the storage electrode 135. The color filters 230 may extend substantially in the longitudinal direction along the pixel electrodes 190, and it is preferable that the color filters 230 disposed in the different areas with respect to the data lines 171 represent different colors and sequentially represent red, green, and blue.

At this time, the gate insulating layer 140 and the lower passivation layer 180p exposed through the opening 235 of the color filters 230 as a dielectric of the storage capacitor is only disposed between the pixel electrode 190 connected to the drain electrode 175 and the storage electrode 135.

Each pixel electrode 190 is chamfered at its left corners and the chamfered edges of the pixel electrode 190 make an angle of about 45 degrees with the gate lines 121.

Each pixel electrode 190 has a lower cutout 92a, a center cutout 91, and an upper cutout 92b, which partition the pixel electrode 190 into a plurality of partitions. The cutouts 91-92b substantially have inversion symmetry with respect to an imaginary transverse line bisecting the pixel electrode 190.

The lower and the upper cutouts 92a and 92b obliquely extend from a right edge of the pixel electrode 190 near an upper right corner and a lower right corner, respectively, to approximately the center of the left edge of the pixel electrode 190. The lower and the upper cutouts 92a and 92b are disposed at lower and upper halves of the pixel electrode 190, respectively, which can be divided by an imaginary transverse line. The lower and the upper cutouts 92a and 92b make an angle of about 45 degrees to the gate lines 121, and they extend substantially perpendicular to each other.

The center cutout 91 extends along the imaginary transverse line and has an inlet from the right edge of the pixel electrode 190, which has a pair of inclined edges substantially parallel to the lower cutout 92a and the upper cutout 92b, respectively.

Accordingly, the lower half of the pixel electrode 190 is partitioned into two lower partitions by the lower cutout 92a, and the upper half of the pixel electrode 190 is partitioned into two upper partitions by the upper cutout 92b. The number of partitions or the number of cutouts is varied depending on design factors, such as the size of pixels, the ratio of the transverse edges and the longitudinal edges of the pixel electrodes, the type and characteristics of the liquid crystal layer 3, and so on.

The description of the common electrode panel 200 follows with reference to FIGS. 13-15.

A light blocking member 220, called a black matrix, for preventing light leakage is formed on an insulating substrate 210 (FIG. 15) made of a material such as transparent glass.

The light blocking member 220 may include a plurality of openings that face the pixel electrodes 190, and may have substantially the same planar shape as the pixel electrodes 190. Otherwise, the light blocking member 220 may include linear portions corresponding to the data lines 171 and other portions corresponding to the TFTs.

An overcoat 250 for providing a flat surface is formed on the light blocking member 220.

A common electrode 270, preferably made of a transparent conductive material such as ITO or IZO, is formed on the overcoat 250. At this time, the overcoat 250 may be omitted.

The common electrode 270 has a plurality of sets of cutouts 71-72b.

A set of cutouts 71-72b faces a pixel electrode 190 and includes a lower cutout 72a, a center cutout 71, and an upper cutout 72b. Each of the cutouts 71-72b is disposed between adjacent cutouts 91-92b of the pixel electrode 190 or between the lower or upper cutouts 92a or 92b and a chamfered edge of the pixel electrode 190. In addition, each of the cutouts 71-72b has at least an oblique portion extending parallel to the lower cutout 92a or the upper cutout 92b of the pixel electrode 190, and the distances between two adjacent cutouts 71-72b and 91-92b, the oblique portions thereof, the oblique edges thereof, and the chamfered edges of the pixel electrode 190, which are parallel to each other, are substantially the same. The cutouts 71-72b substantially have inversion symmetry with respect to the above-described transverse line bisecting the pixel electrode 190.

Each of the lower and upper cutouts 72a and 72b includes an oblique portion extending approximately from a left edge of the pixel electrode 190 to approximately a lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center cutout 71 includes a central transverse portion extending approximately from the center of the left edge of the pixel electrode 190, a pair of oblique portions extending from an end of the central transverse portion approximately to the right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts 71-72b may be varied depending on design factors, and the light blocking member 220 may also overlap the cutouts 71-72b to block light leakage through the cutouts 71-72b.

Alignment layers 11 and 21 that may be homeotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating retardation of the LC layer 3. The retardation film has birefringence and gives retardation opposite to that given by the LC layer 3. The retardation film may include a uniaxial or biaxial optical compensation film, and in particular, a negative uniaxial compensation film.

The LCD may further include a backlight unit (not shown) for supplying light to the LC layer 3 through the polarizers 12 and 22, the retardation film, and the panels 100 and 200.

It is preferable that the LC layer 3 has negative dielectric anisotropy and that it is subjected to vertical alignment wherein the LC molecules 310 in the LC layer 3 are aligned such that their long axes are substantially vertical to the surfaces of the panels 100 and 200 in the absence of an electric field.

As shown in FIG. 14, a set of cutouts 91-92b and 71-72b divides a pixel electrode 190 into a plurality of sub-areas, and each sub-area has two major edges.

Upon application of the common voltage to the common electrode 270 and a data voltage to the pixel electrodes 190, an electric field substantially perpendicular to the surfaces of the panels 100 and 200 is generated. The LC molecules 310 tend to change their orientations in response to the electric field such that their long axes become perpendicular to the field direction.

The cutouts 91-92b and 71-72b of the electrodes 190 and 270 and the edges of the pixel electrodes 190 distort the electric field to have a horizontal component that is substantially perpendicular to the edges of the cutouts 91-92b and 71-72b and the edges of the pixel electrodes 190. Accordingly, the LC molecules on each sub-area are tilted in a direction by the horizontal component, and the azimuthal distribution of the tilt directions is localized to four directions, thereby increasing the viewing angle of the LCD.

At least one of the cutouts 91-92b and 71-72b can be substituted with protrusions (not shown) or depressions (not shown). The protrusions are preferably made of organic or inorganic material and disposed on or under the field-generating electrodes 190 or 270, and it is preferable that the width of the protrusions is in the range of 5-10 μm.

Since the tilt directions of all domains make an angle of about 45 degrees with the gate lines 121, which are parallel or perpendicular to the edges of the panels 100 and 200, and the 45-degree intersection of the tilt directions and the transmissive axes of the polarizers 12 and 22 gives maximum transmittance, the polarizers 12 and 22 can be attached such that the transmissive axes of the polarizers 12 and 22 are parallel or perpendicular to the edges of the panels 100 and 200, which reduces the production cost.

The shapes and the arrangements of the cutouts 91-92b and 71-72b may be modified.

Many of the above-described features of the LCD according to the previous embodiment may be appropriate for the TFT array panel shown in FIGS. 12-15.

An LCD according to another embodiment of the present invention will be described in detail with reference to FIGS. 16-20.

Figure 16:
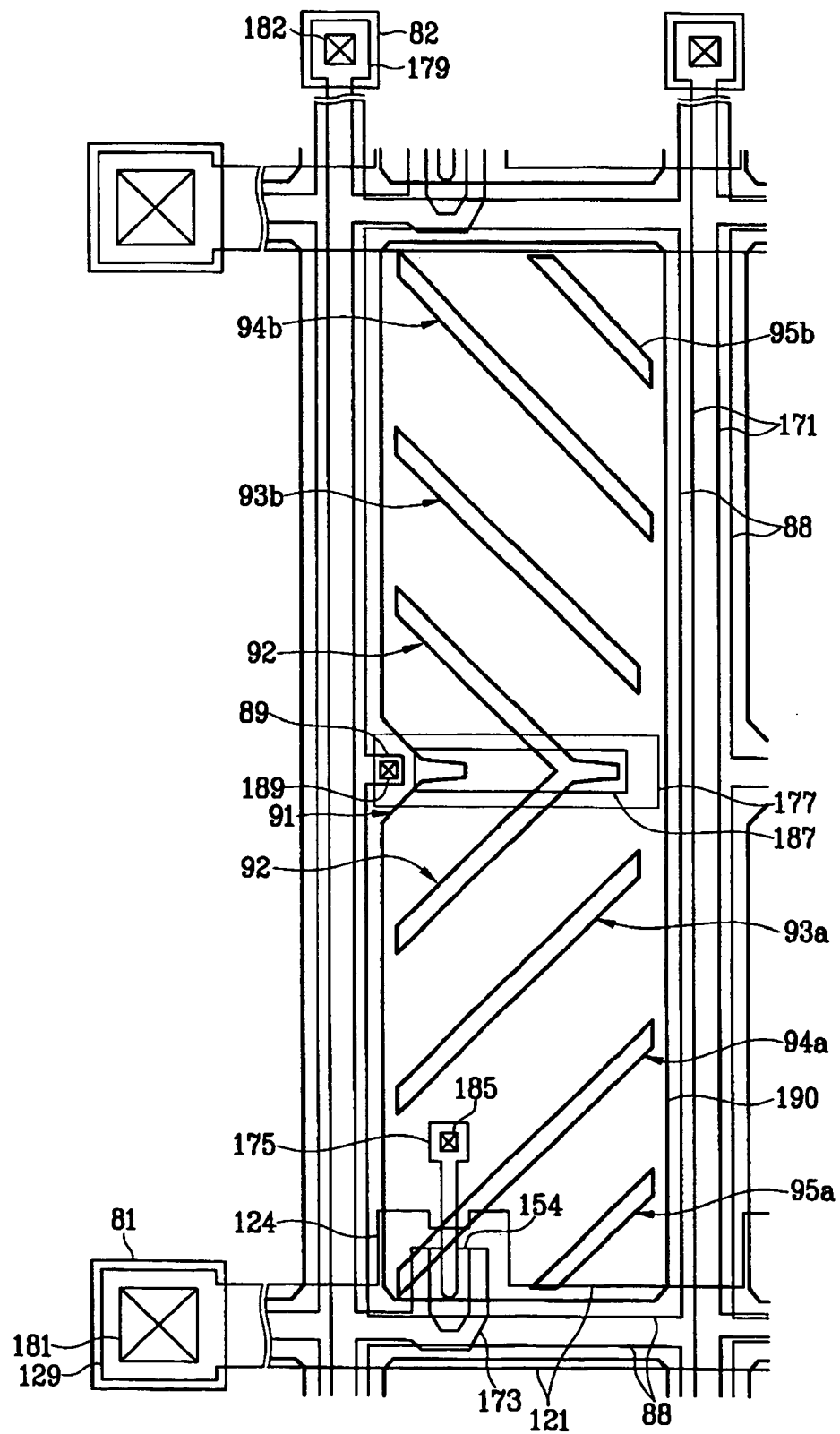
FIG. 16 is a layout view of a TFT array panel of an LCD according to another embodiment of the present invention.
Figure 17:
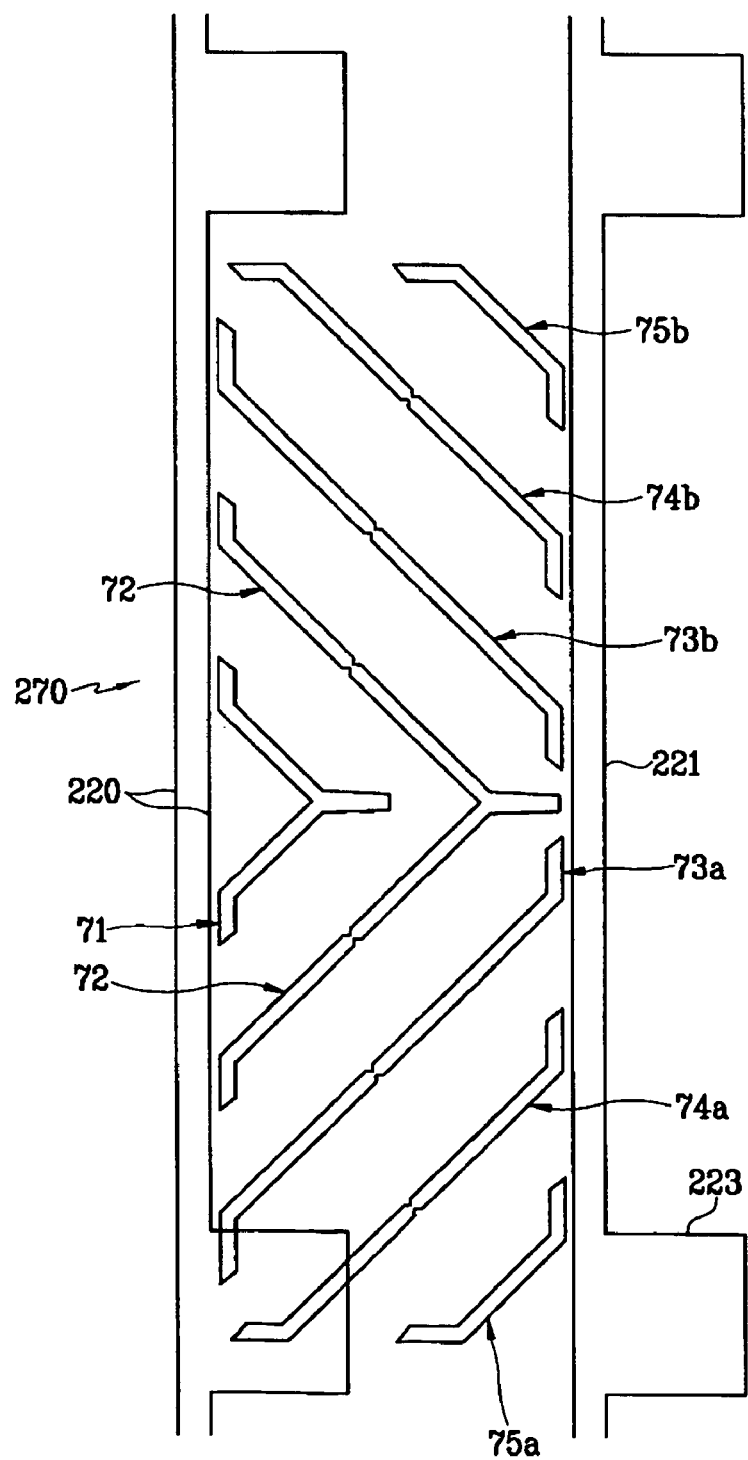
FIG. 17 is a layout view of a common electrode panel of an LCD according to another embodiment of the present invention.
Figure 18:
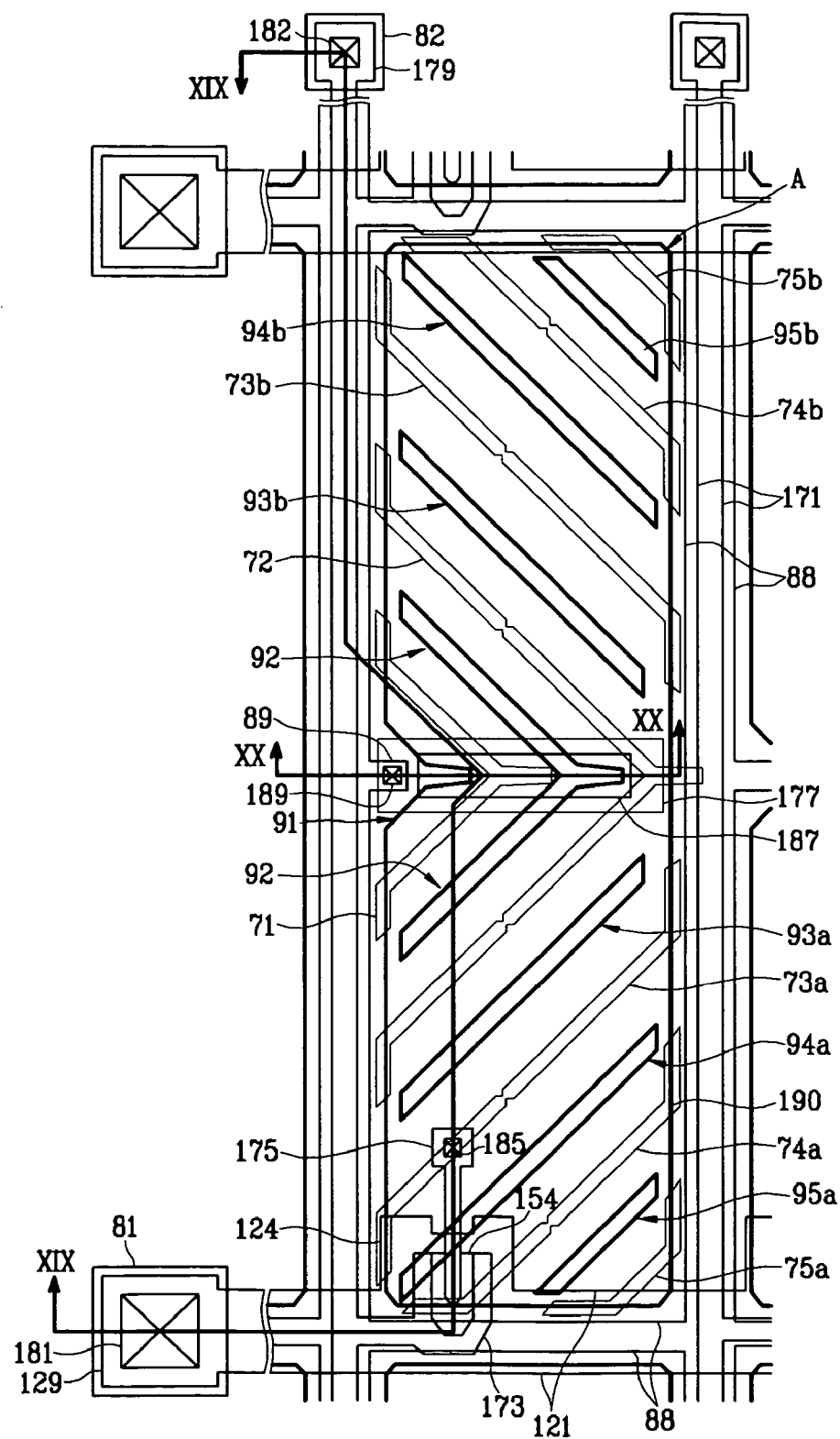
FIG. 18 is a layout view of an LCD including the TFT array panel shown in FIG. 16 and the common electrode panel shown in FIG. 17.
Figure 19:
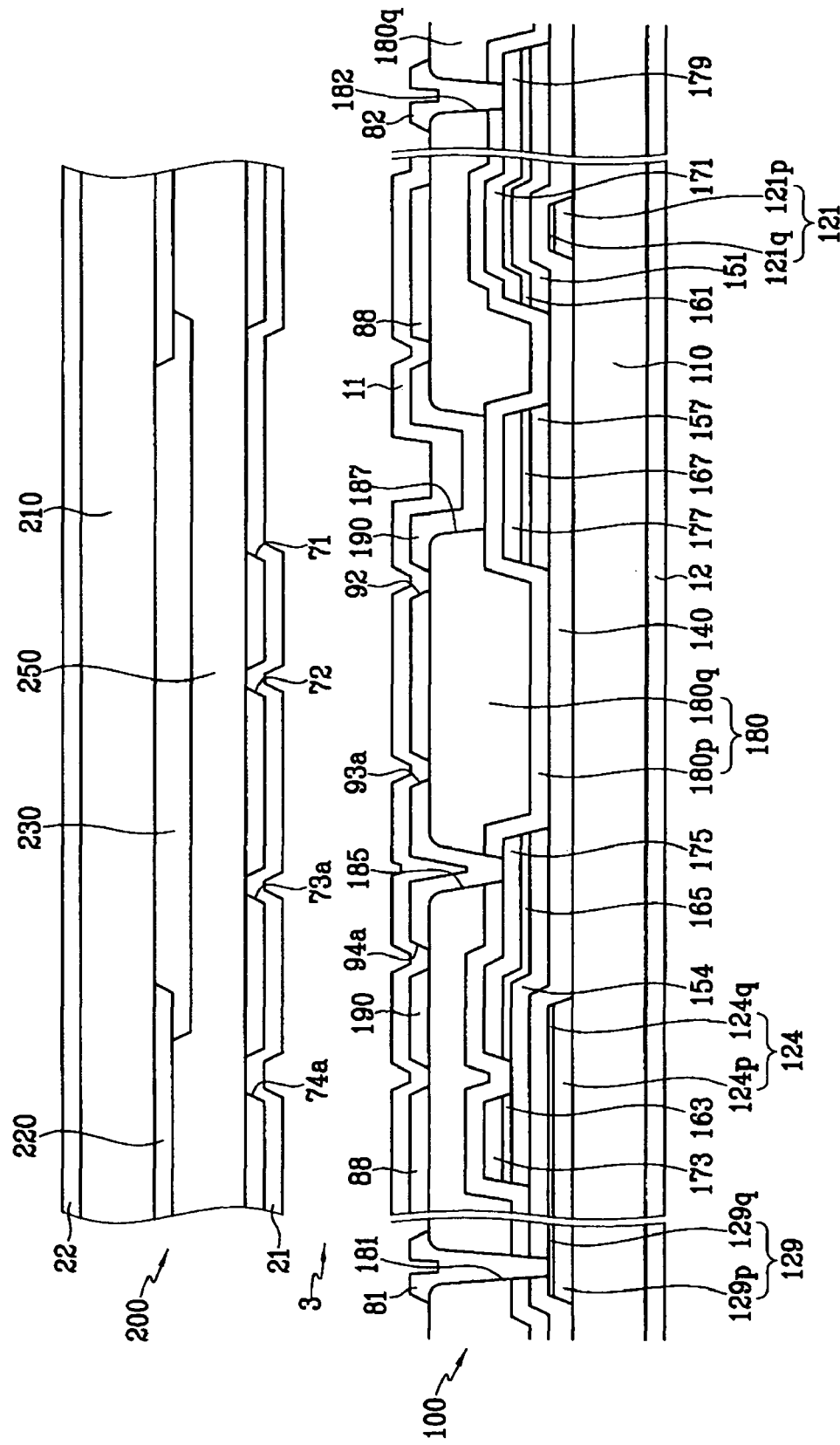
FIGS. 19 and 20 are sectional views of the LCD shown in FIG. 18 taken along the lines XIX-XIX and XX-XX.
Figure 20:
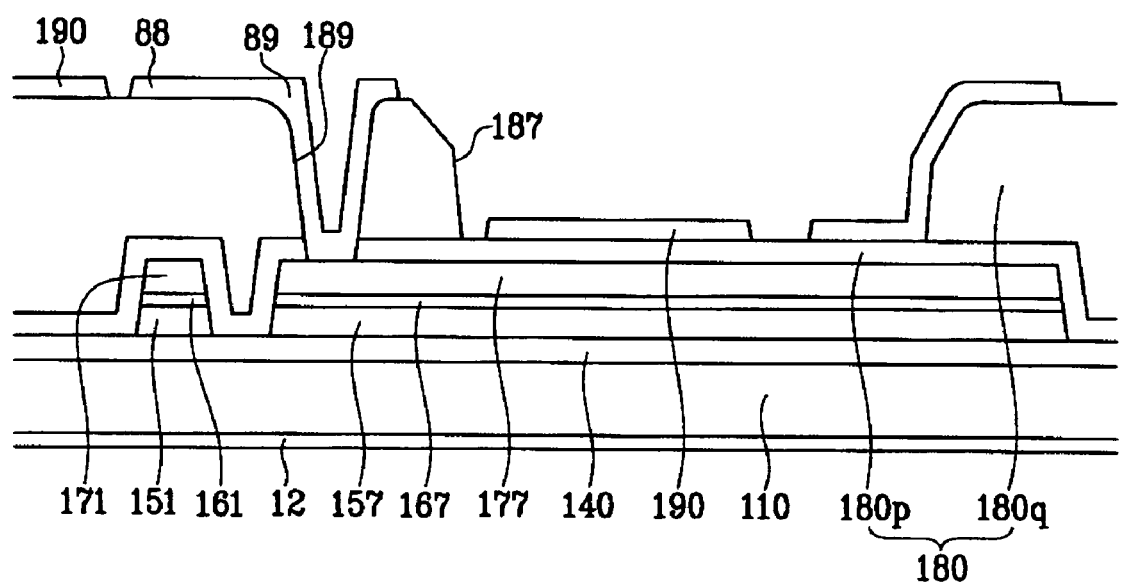

FIG. 16 is a layout view of a TFT array panel of an LCD according to another embodiment of the present invention; FIG. 17 is a layout view of a common electrode panel of an LCD according to an embodiment of the present invention; FIG. 18 is a layout view of an LCD including the TFT array panel shown in FIG. 16 and the common electrode panel shown in FIG. 17; and FIGS. 19 and 20 are sectional views of the LCD shown in FIG. 18 taken along the lines XIX-XIX and XX-XX, respectively.

Referring to FIGS. 16-20, an LCD according to this embodiment also includes a TFT array panel 100, a common electrode panel 200, an LC layer 3 interposed between the panels 100 and 200, and a pair of polarizers 12 and 22 attached to outer surfaces of the panels 100 and 200.

Layered structures of the panels 100 and 200 according to this embodiment are almost the same as those shown in FIGS. 12-15.

Regarding the TFT array panel 100, a plurality of gate lines 121 including gate electrodes 124 and end portions 129 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including a plurality of source electrodes 173 and a plurality of end portions 179, and a plurality of drain electrodes 175 are formed on the ohmic contacts 161 and 165, and a passivation layer 180 is formed thereon. A plurality of contact holes 181, 182, and 185 are provided at the passivation layer 180 and the gate insulating layer 140. A plurality of pixel electrodes 190, and a plurality of contact assistants 81 and 82 are formed on the passivation layer 180, and an alignment layer 11 is coated thereon.

Differently from the previous embodiment, the additional storage electrode lines are omitted.

A plurality of semiconductor islands 157 which are disposed almost at the center between two adjacent gate lines 121 and are made of the same layer as the semiconductor strips 151, are formed on the gate insulating layer 140, and a plurality of ohmic contact islands 167 are formed thereon.

The source electrodes 173 have a "U" shape, and enclose the end portions of the drain electrodes 175. A plurality of storage conductors 177 are formed on the ohmic contact islands 167 and are made of the data lines 171.

The passivation layer 180 has a plurality of contact holes 189 exposing the portion of the storage conductors 177, and the upper passivation layer 180q has a plurality of openings 187 exposing the lower passivation layer 180p and disposed on the storage conductors 177. The contact holes 181, 182, 185, and 189, and the openings 187, have sloping side walls, and at practically the upper side wall of the contact holes 181, 182, 185, and 189, and the openings 187, which are made of the upper passivation layer 180q, the slope angle is in the range between about 30-85 degrees with respect with the surface of the substrate 110.

Each of the pixel electrodes 190 has four chamfered corners forming oblique edges, and they overlap the storage conductors 177 in the opening 187.

Each pixel electrode 190 has a lower cutout 93a, 94a, 95a, a center cutout 91, 92, and an upper cutout 93b, 94b, 95b which partition the pixel electrode 190 into a plurality of partitions. The cutouts 91-95b substantially have inversion symmetry with respect to an imaginary transverse line bisecting the pixel electrode 190.

The lower and upper cutouts 93a-95b obliquely extend from a left edge of the pixel electrode 190 near an upper left corner and a lower left corner, respectively, to approximately a center of a right edge of the pixel electrode 190. The lower and upper cutouts 93a-95b are disposed at lower and upper halves of the pixel electrode 190, respectively, which can be divided by an imaginary transverse line. The lower and upper cutouts 93a-95b make an angle of about 45 degrees to the gate lines 121, and they extend substantially perpendicular to each other.

The center cutout 91 extends along the imaginary transverse line and has an inlet from the left edge of the pixel electrode 190, which has a pair of inclined edges substantially parallel to the lower and the upper cutouts 93a-95b, respectively. The center cutout 91 is disposed near the contact holes 189. The center cutout 92 includes a central transverse portion extending approximately from the center of the right edge of the pixel electrode 190, and a pair of oblique portions extending from an end of the central transverse portion approximately to the left edge of the pixel electrode and making obtuse angles with the central transverse portion. The pair of oblique portions makes an angle of about 45 degrees to the gate lines 121.

The number of partitions or the number of cutouts is varied depending on design factors, such as the size of pixels, the ratio of the transverse edges and the longitudinal edges of the pixel electrodes, the type and characteristics of the liquid crystal layer 3, and so on.

A plurality of shielding electrodes 88 are formed at the same layer as the pixel electrode 190.

The shielding electrodes 88 have a plurality of horizontal portions extended along the gate lines 121 and a plurality of longitudinal portions extended along the data lines 171. The horizontal portions are narrower than the gate lines 121 and the boundaries of the horizontal portions are disposed on the gate lines 121, and the longitude portions are wider than the data lines 171 and completely cover the data lines 171. The longitudinal portions of the shielding electrodes 88 have a plurality of protrusions 89 connected to the storage conductors 177 through the contact holes 189.

The shielding electrodes 88 supplied with the common voltage can block electric fields generated between the pixel electrodes 190 and the data lines 171 and between the common electrode 270 and the data lines 171, such that distortion of the voltage of the pixel electrodes 190 and signal delay of the data voltages transmitted by the data lines 171 are reduced.

Furthermore, since the pixel electrodes 190 are required to be spaced apart from the shielding electrodes 88 for preventing a short circuit therebetween, the pixel electrodes 190 become farther from the data lines 171 such that the parasitic capacitance therebetween is reduced. Moreover, since the permittivity of the LC layer 3 is greater than that of the passivation layer 180, the parasitic capacitance between the data lines 171 and the shielding electrodes 88 is reduced, compared with that between the data lines 171 and the common electrode 270 without the shielding electrodes 88.

The storage conductors 177 supplied with the common voltage from the shielding electrode 88 make a storage capacitor with the pixel electrodes 190 via the lower passivation layer 180p.

As described above, the pixel electrode 191 and the storage conductors 177 overlap each other only via the lower passivation layer 180p made of inorganic material, such that the storage capacitance is sufficient without a storage electrode at the same layer as the gate lines 121. Accordingly, a stable storage capacitor can be formed by removing the amorphous silicon between the pixel electrode 191 and the storage conductors 177. As a result, a flicker on the screen, as well as an afterimage, may be prevented, thereby enhancing the characteristics of the LCD.

The description of the common electrode panel 200 follows with reference to FIGS. 17-19.

Regarding the common electrode panel 200, a light blocking member 220, an overcoat 250, a common electrode 270, and an alignment layer 21 are formed on an insulating substrate 210 as in the previous embodiment.

The light blocking member includes a plurality of longitudinal portions 221 facing the data lines 171 and a plurality of quadrangle portions 223 facing the TFTs, such that the light blocking member 220 prevents light leakage between the pixel electrodes 190 and defines open areas facing the pixel electrodes 190.

A plurality of color filters 230 are formed on the substrate 210 and the light blocking member 220, being disposed substantially in the open areas defined by the light blocking member 220. The color filters 230 disposed at two adjacent data lines 171 and arranged in the longitudinal direction may be connected to each other to form a stripe. Each color filter 230 may represent one of three primary colors such as red, green, and blue.

An overcoat 250 preferably made of organic material is formed on the color filters 230 and the light blocking member 220. The overcoat 250 protects the color filters 230 and has a flat top surface.

The common electrode 270 has a plurality of sets of cutouts 71-75b.

A set of cutouts 71-75b faces a pixel electrode 190 and includes a lower cutout 73a, 74a, 75a, a center cutout 71, 72, and an upper cutout 73b, 74b, 75b. Each of the cutouts 71-75b is disposed between adjacent cutouts 91-95b of the pixel electrode 190 or between the lower or upper cutouts 95a or 95b and a chamfered edge of the pixel electrode 190. In addition, each of the cutouts 71-75b has at least an oblique portion extending parallel to the lower cutout 93a, 94a, 95a or the upper cutout 93b, 94b, 95b of the pixel electrode 190.

Each of the lower cutouts 74a, 75a and upper cutouts 74b, 75b includes an oblique portion extending approximately from a left edge of the pixel electrode 190 to approximately a lower or upper edge of the pixel electrode 190, and transverse and longitudinal portions extend from respective ends of the oblique portion along edges of the pixel electrode 190, overlapping the edges of the pixel electrode 190, and making obtuse angles with the oblique portion.

Each of the lower and upper cutouts 73*a* and 73*b* includes an oblique portion extending approximately from a left edge of the pixel electrode 190 to approximately a lower or upper edge of the pixel electrode 190, and a pair of longitudinal portions extend from respective ends of the oblique portion along edges of the pixel electrode 190, overlapping the left and the right edges of the pixel electrode 190, and making obtuse angles with the oblique portion.

The center cutout 71 and 72 include a central transverse portion extending approximately from the center of the right edge of the pixel electrode 190, a pair of oblique portions extending from an end of the central transverse portion approximately to the left edge of the pixel electrode 190 and making obtuse angles with the central transverse portion, and a pair of terminal longitudinal portions extending from the ends of the respective oblique portions along the left edge of the pixel electrode 190, overlapping the left edge of the pixel electrode 190, and making obtuse angles with the respective oblique portions.

Figure 21:
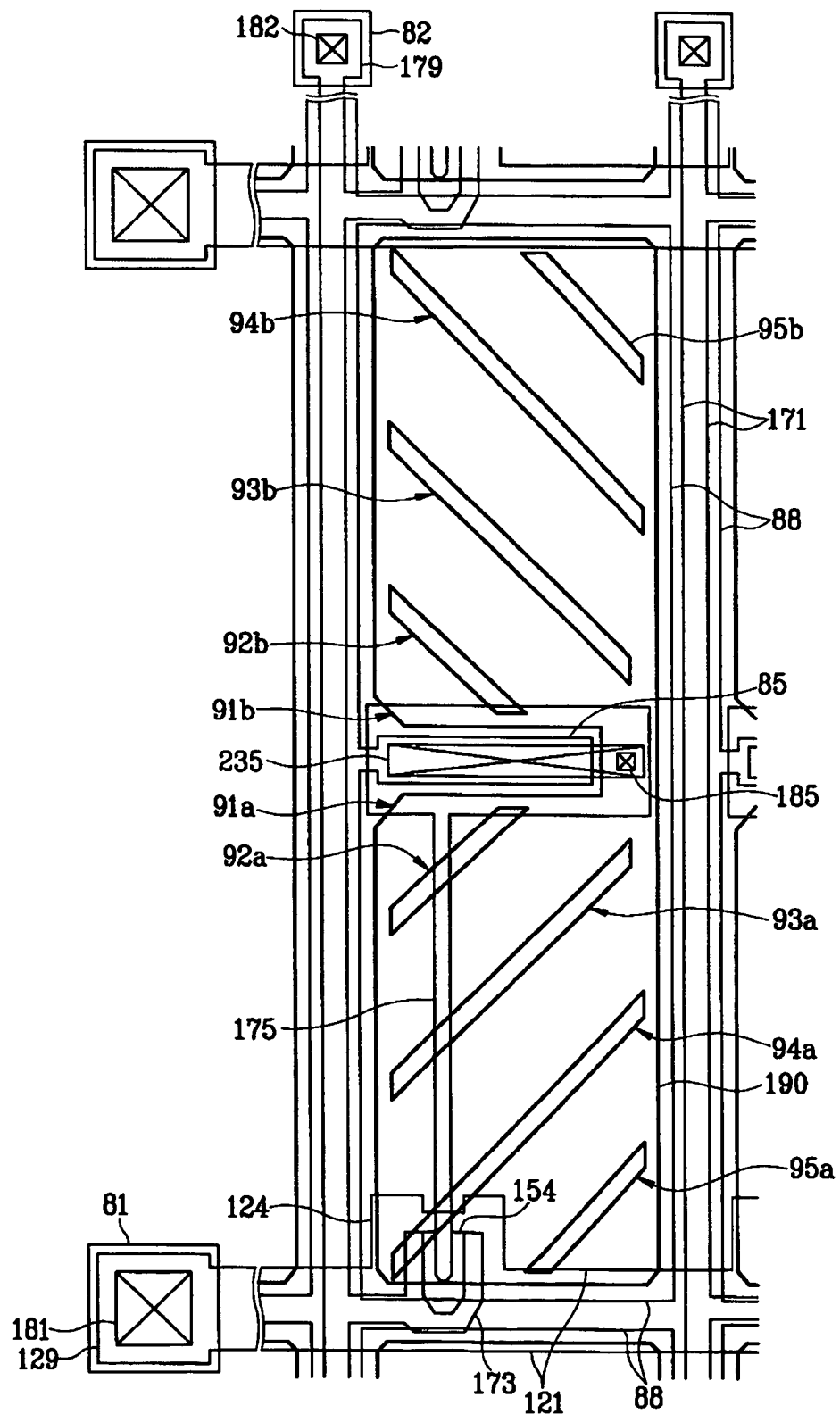
FIG. 21 is a layout view of a TFT array panel of an LCD according to another embodiment of the present invention.
Figure 22:
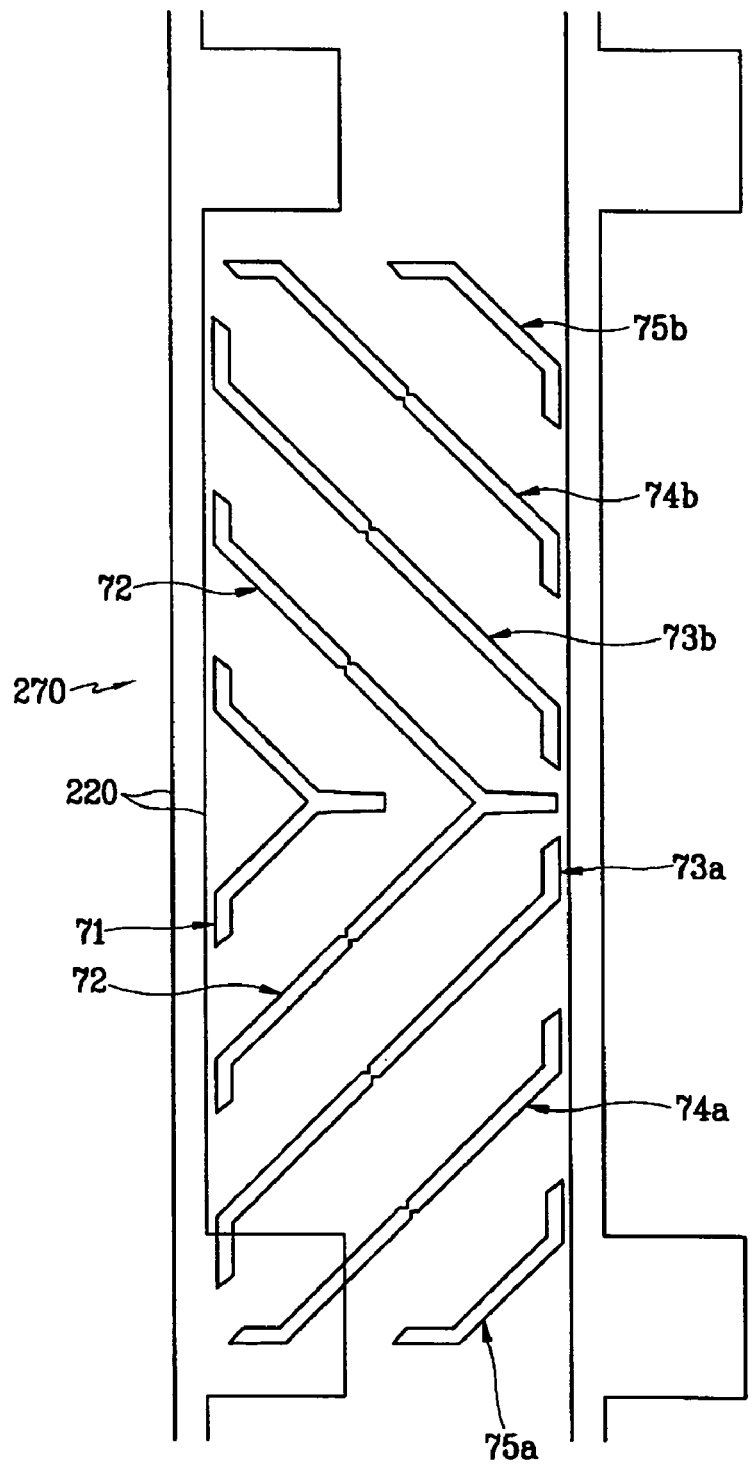
FIG. 22 is a layout view of a common electrode panel of an LCD according to another embodiment of the present invention.
Figure 23:
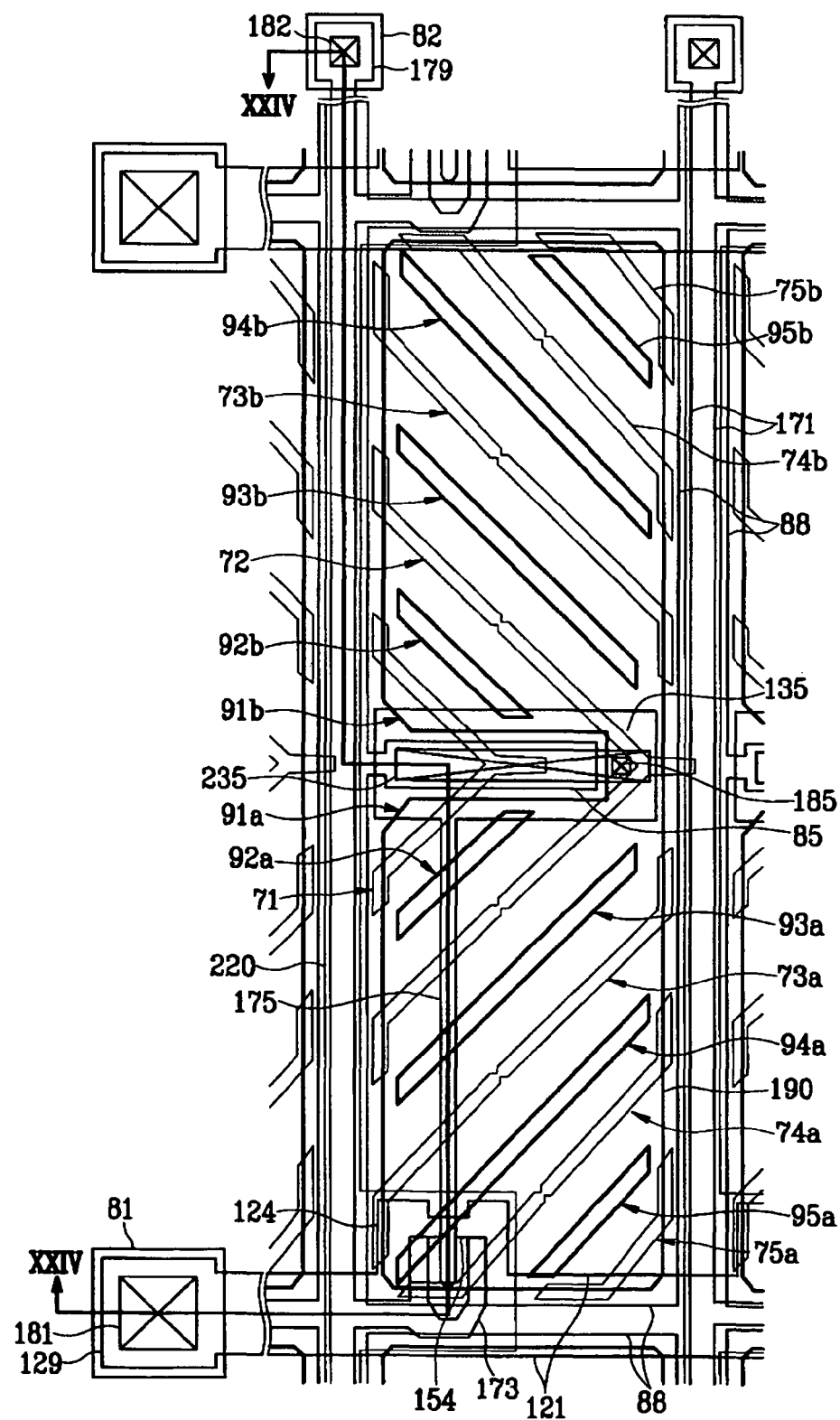
FIG. 23 is a layout view of an LCD including the TFT array panel shown in FIG. 21 and the common electrode panel shown in FIG. 22.
Figure 24:
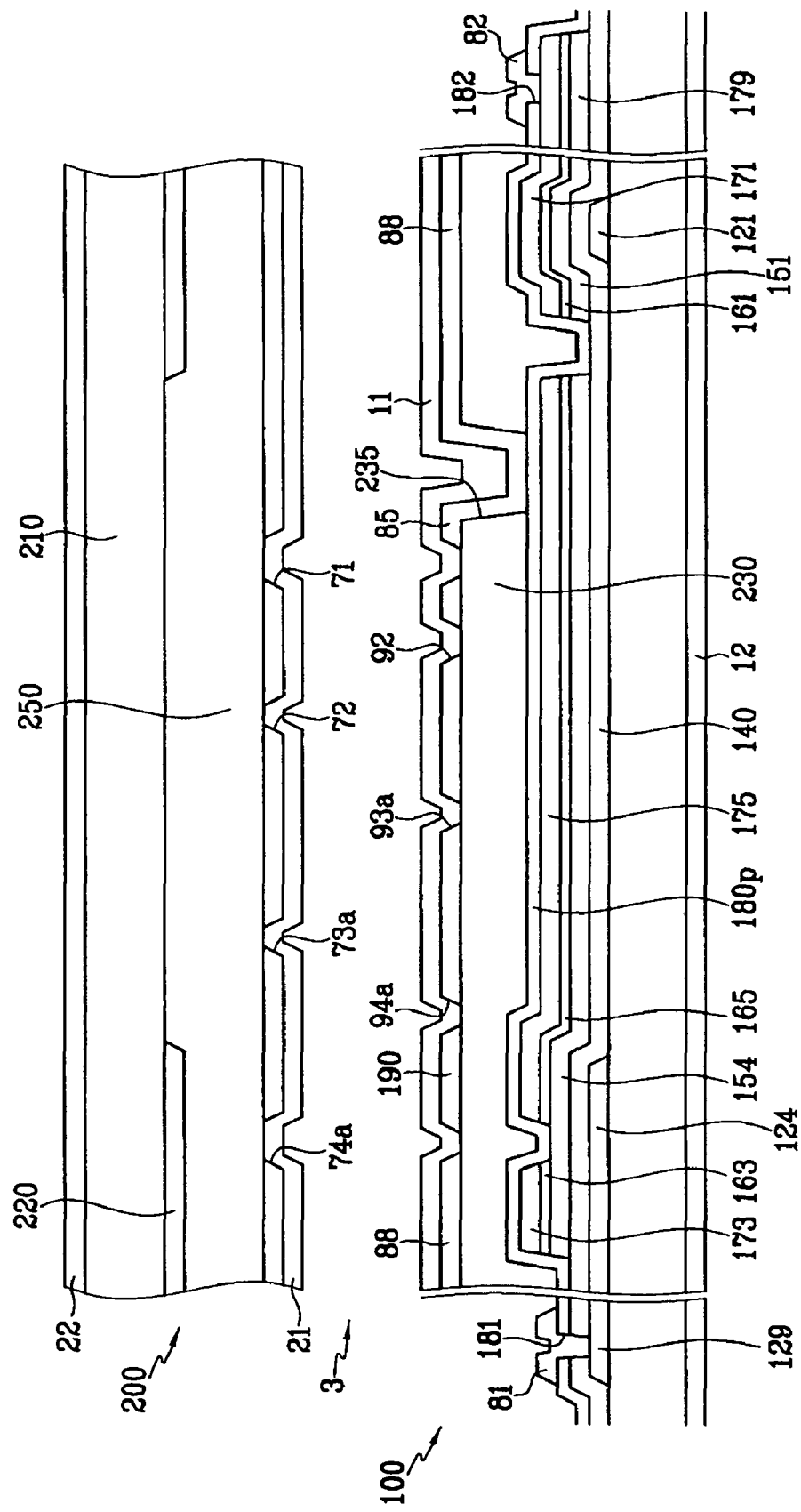
FIG. 24 is a sectional view of the LCD shown in FIG. 23 taken along the lines XXIV-XXIV.

FIG. 21 is a layout view of a TFT array panel of an LCD according to another embodiment of the present invention; FIG. 22 is a layout view of a common electrode panel of an LCD according to an embodiment of the present invention; FIG. 23 is a layout view of an LCD including the TFT array panel shown in FIG. 21 and the common electrode panel shown in FIG. 22; and FIG. 24 is a sectional view of the LCD shown in FIG. 23 taken along the line XXIV-XXIV.

Referring to FIGS. 21-24, an LCD according to this embodiment also includes a TFT array panel 100, a common electrode panel 200, an LC layer 3 interposed between the panels 100 and 200, and a pair of polarizers 12 and 22 attached on outer surfaces of the panels 100 and 200, respectively.

Layered structures of the panels 100 and 200 according to this embodiment are almost the same as those shown in FIGS. 12-15.

Regarding the TFT array panel 100, a plurality of gate lines 121 including gate electrodes 124 and end portions 129 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including a plurality of source electrodes 173 and a plurality of end portions 179, and a plurality of drain electrodes 175 are formed on the ohmic contacts 161 and 165, and a passivation layer including a lower passivation layer 180*p* and a plurality of color filters 230 is formed thereon. A plurality of contact holes 181, 182, and 185 are provided at the lower passivation layer 180*p* and the gate insulating layer 140. The color filters 230 have a plurality of openings 235 exposing the lower passivation layer 180*p* and the contact holes 185, and a plurality of pixel electrodes 190, and a plurality of contact assistants 81 and 82 are formed on the passivation layer 180, and an alignment layer 11 is coated thereon.

Regarding the common electrode panel 200, a light blocking member 220, an overcoat 250, a common electrode 270, and an alignment layer 21 are formed on an insulating substrate 210 as in the previous embodiment.

Differently from the previous embodiment, the drain electrodes 174 have a plurality of expansions expanded to the center of the pixel electrodes 190 in a transverse direction, and the openings 235 expose the expansions of the drain electrodes 175. The openings 235 may or may not extend to the contact holes 185 to connect the pixel electrodes 190 and the drain electrodes 175.

Each of the pixel electrodes 190 has four chamfered corners forming oblique edges, and a plurality of shielding electrodes 88 are formed at the same layer as the pixel electrode 190.

The shielding electrodes 88 have a plurality of storage electrode portions 85 disposed in the concave portion of the pixel electrode 190 and overlapping the drain electrodes 175 via the openings 235 of the color filters 230. At this time, the drain electrodes 175 supplied with the pixel voltages overlap the storage electrode portions 85 to make a storage capacitor without storage electrode lines at the same layer as the gate lines 121. At this time, because the drain electrodes 175 and the storage electrode portions 85 of the storage capacitor overlap each other only via the lower passivation layer 180*p*, the storage capacitance may be sufficiently provided with a minimized area. In addition, the area of the opaque drain electrodes 175 may be minimized, such that the aperture ratio of the pixels may be maximized. The shapes of the storage electrode portions of the shielding electrode 88, the opening of the color filter 230, and the expansions of the drain electrodes 175, are varied to improve the characteristics of the liquid crystal device.

Many of the above-described features of the LCD according to the previous embodiment may be appropriate for the TFT array panel shown in FIGS. 21-24.

Figure 25:
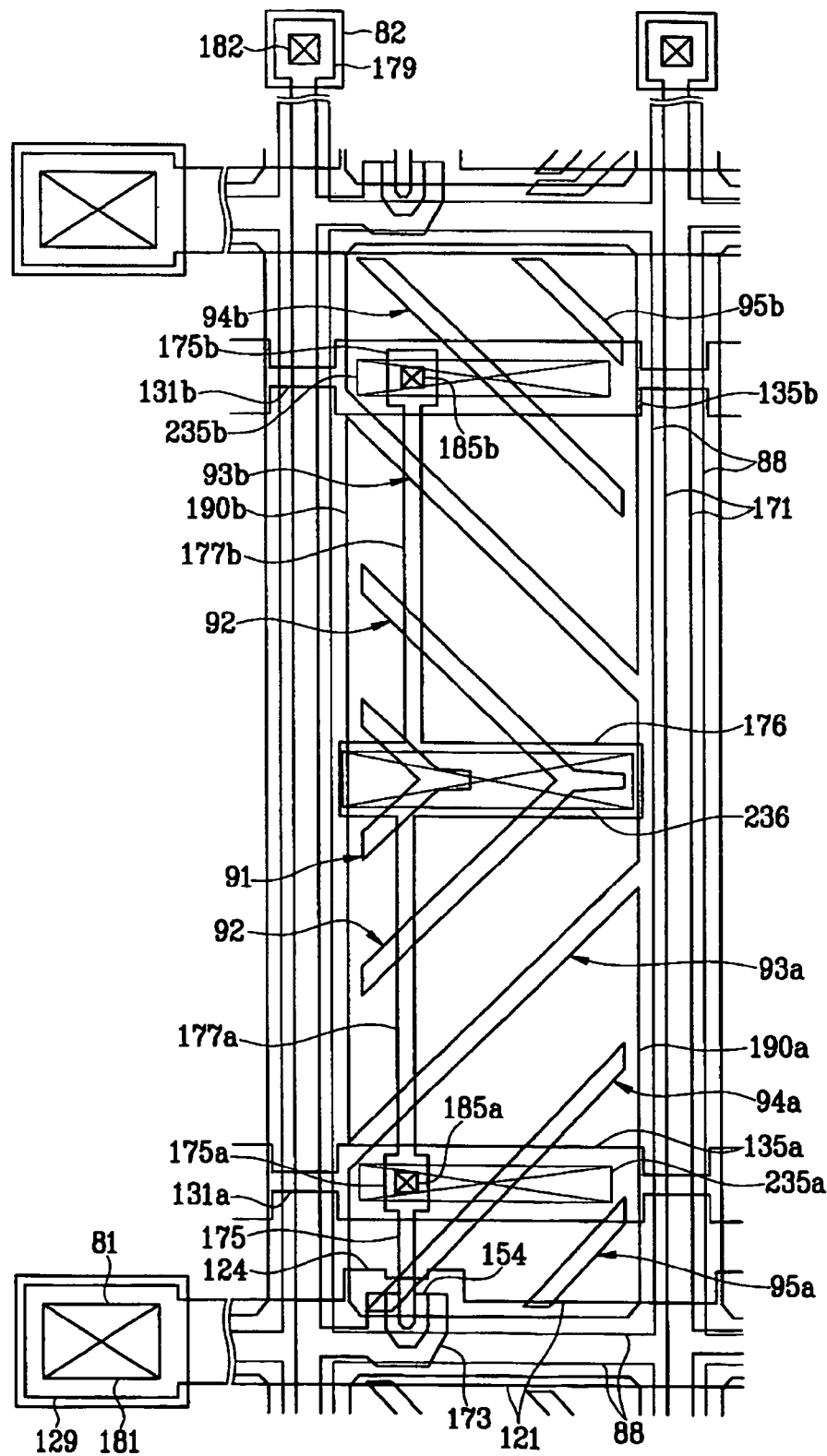
FIG. 25 is a layout view of a TFT array panel of an LCD according to another embodiment of the present invention.
Figure 26:
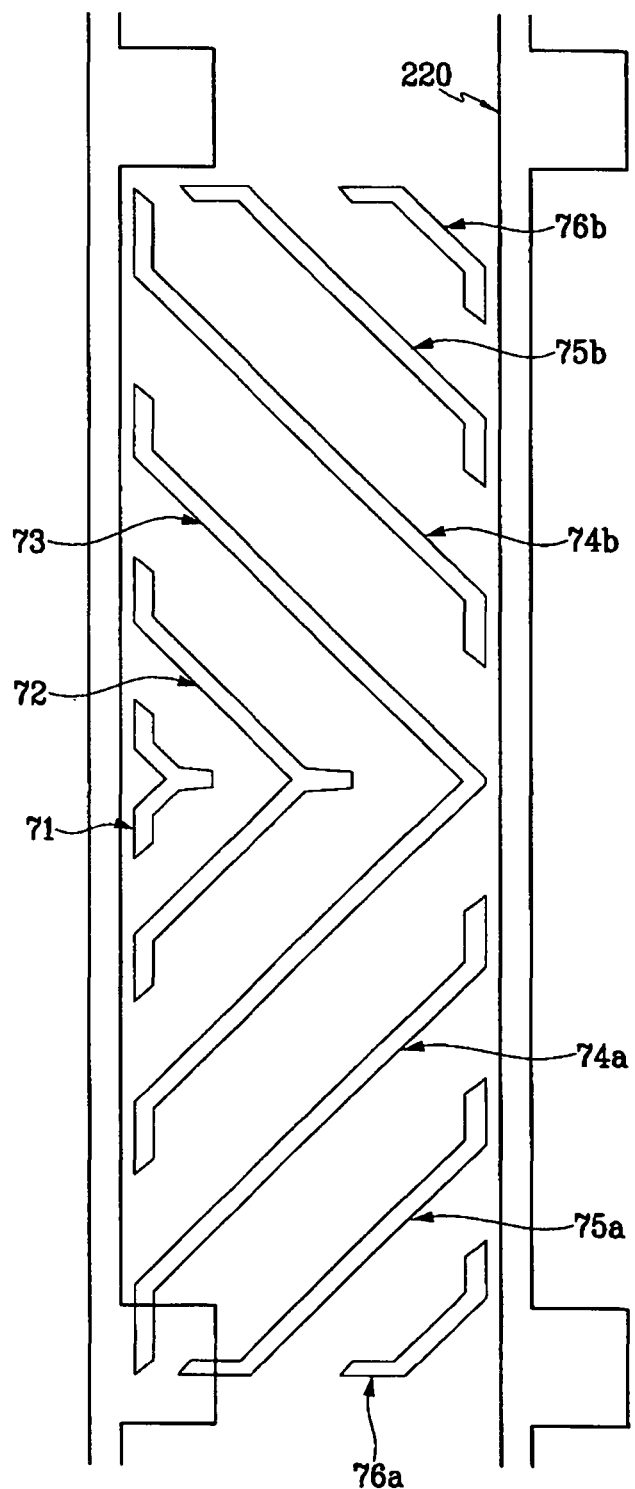
FIG. 26 is a layout view of a common electrode panel of an LCD according to another embodiment of the present invention.
Figure 27:
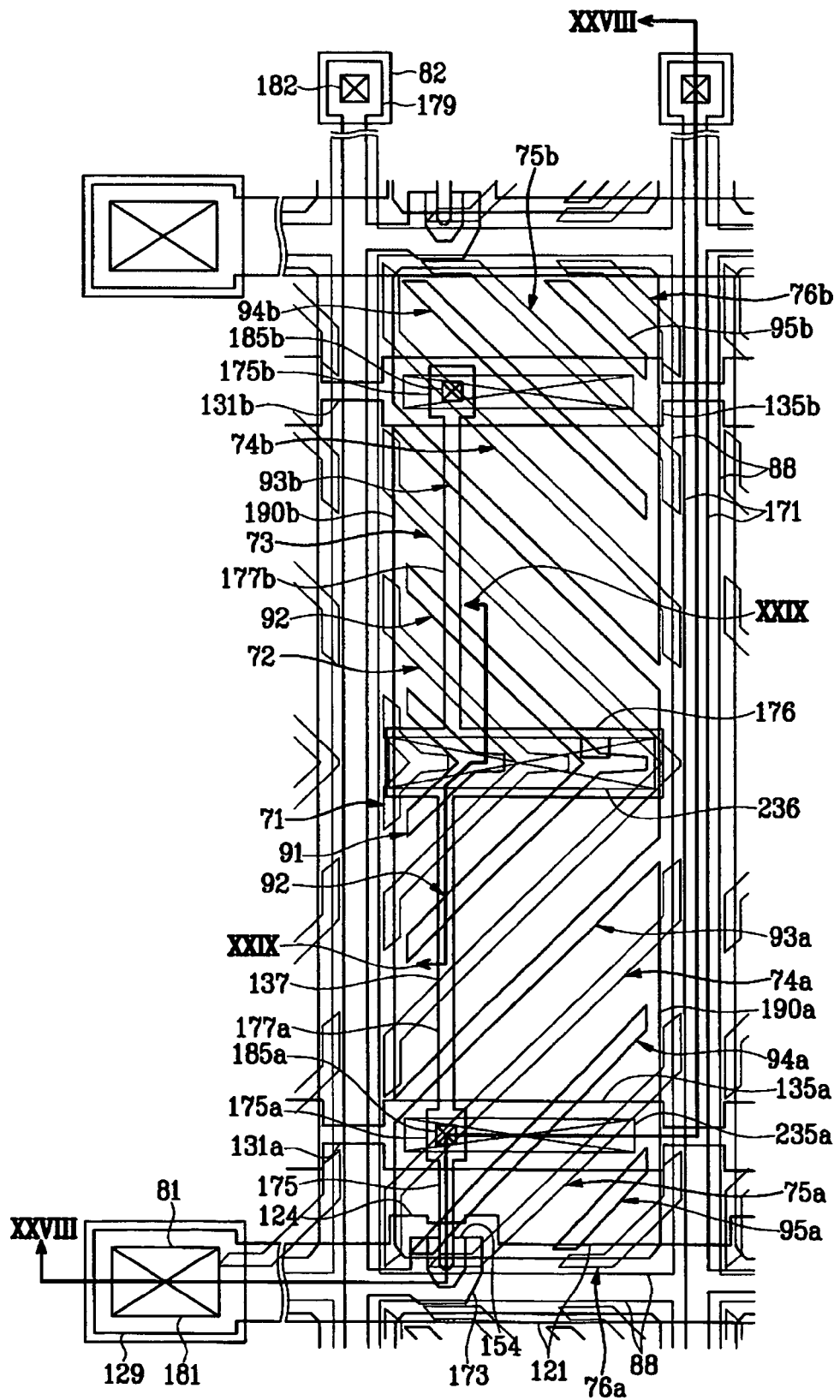
FIG. 27 is a layout view of an LCD including the TFT array panel shown in FIG. 25 and the common electrode panel shown in FIG. 26.
Figure 28:
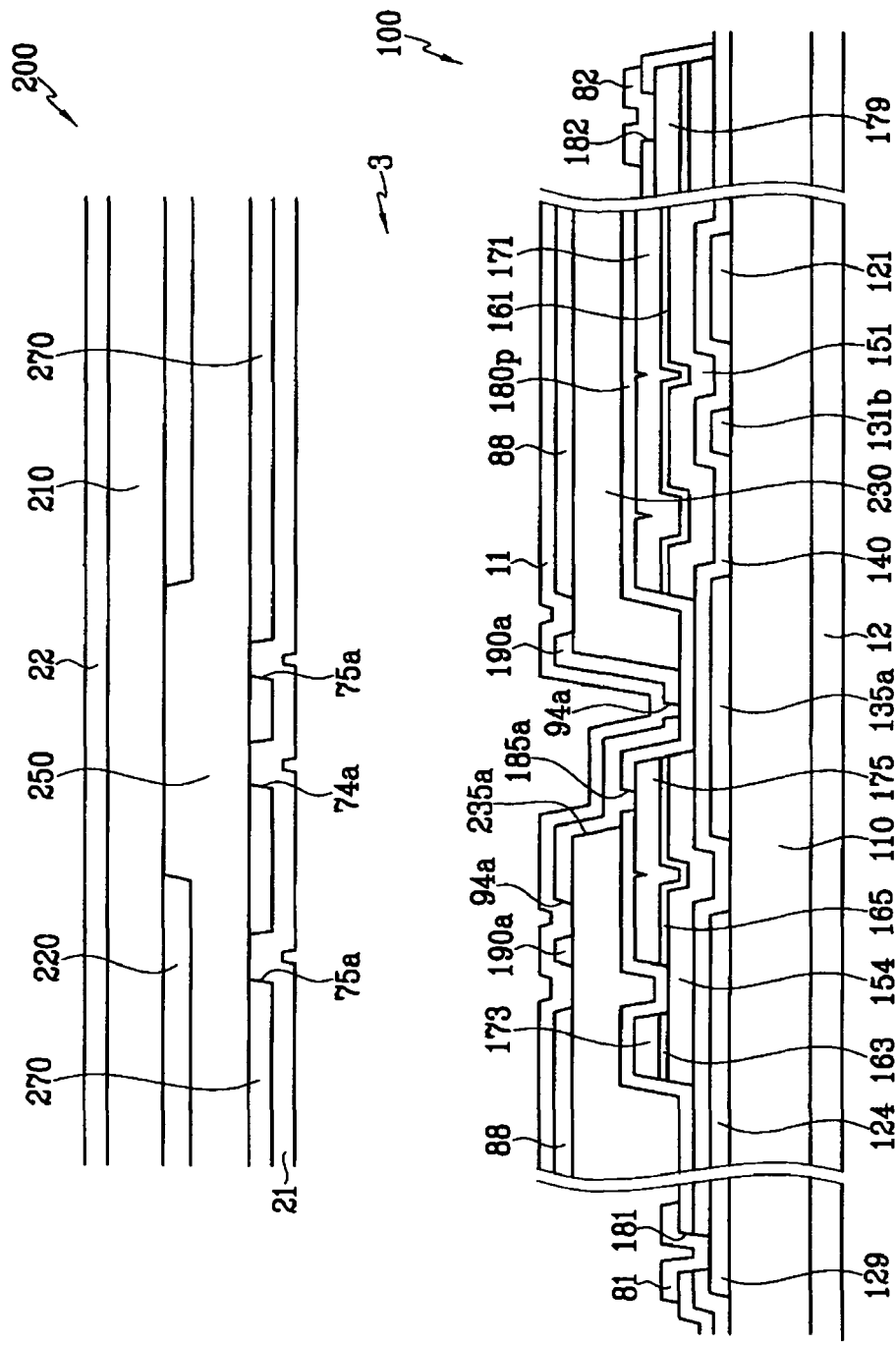
FIGS. 28 and 29 are sectional views of the LCD shown in FIG. 27 taken along the lines XXVIII-XXVIII and XXIX-XXIX.
Figure 29:
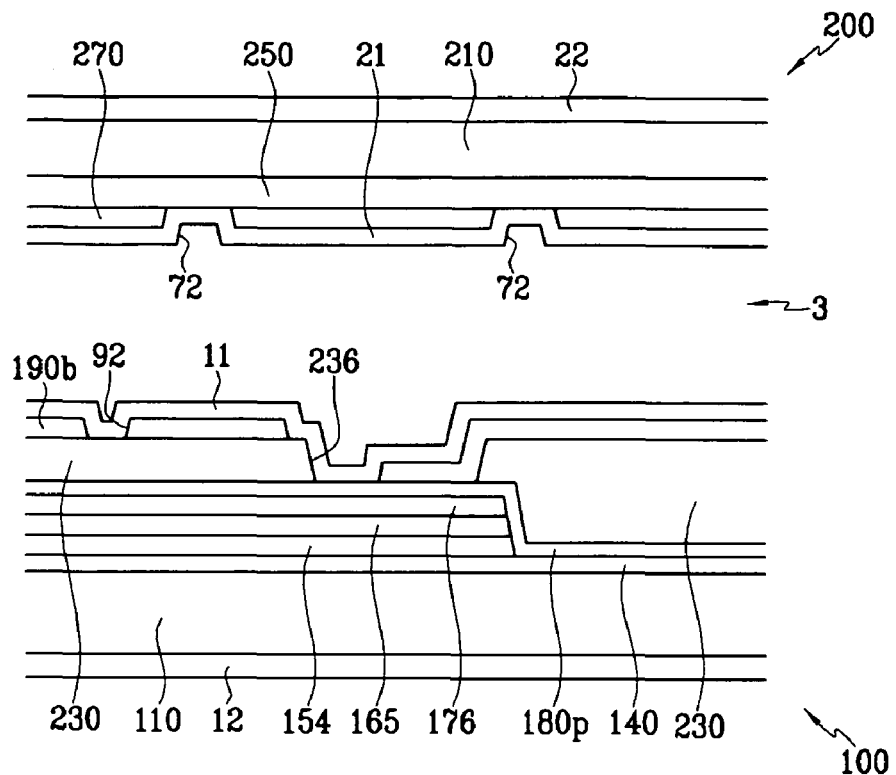
Figure 30:
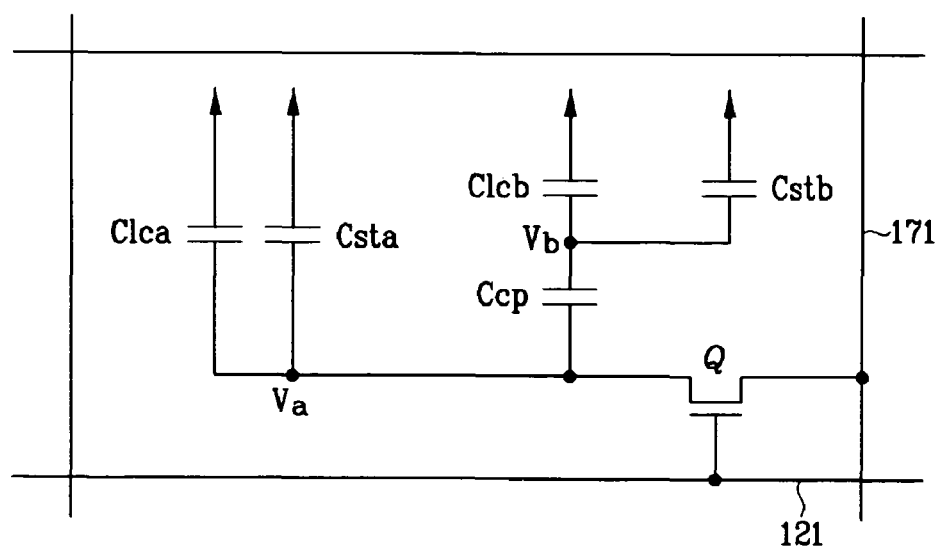
FIG. 30 is an equivalent circuit of the LCD shown in FIGS. 25-29.

FIG. 25 is a layout view of a TFT array panel of an LCD according to another embodiment of the present invention; FIG. 26 is a layout view of a common electrode panel of an LCD according to an embodiment of the present invention; FIG. 27 is a layout view of an LCD including the TFT array panel shown in FIG. 25 and the common electrode panel shown in FIG. 26; FIGS. 28 and 29 are sectional views of the LCD shown in FIG. 27 taken along the lines XXVIII-XXVIII and XXIX-XXIX; and FIG. 30 is an equivalent circuit of the LCD shown in FIGS. 25-29.

Referring to FIGS. 25-29, an LCD according to this embodiment also includes a TFT array panel 100, a common electrode panel 200, and an LC layer 3 interposed between the panels 100 and 200.

Layered structures of the panels 100 and 200 according to this embodiment are almost the same as those shown in FIGS. 21-24.

Regarding the TFT array panel 100, a plurality of gate lines 121 including gate electrodes 124 and end portions 129 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including a plurality of source electrodes 173 and a plurality of end portions 179, and a plurality of drain electrodes 175 are formed on the ohmic contacts 161 and 165, and a passivation layer 180 is formed thereon. A plurality of contact holes 181 and 182 are provided at the passivation layer 180 and the gate insulating layer 140. A plurality of first and second pixel electrodes 190*a* and 190*b*, and a plurality of contact assistants 81 and 82 are formed on the passivation layer 180, and an alignment layer 11 is coated thereon.

Regarding the common electrode panel 200, a light blocking member 220, an overcoat 250, a common electrode 270, and an alignment layer 21 are formed on an insulating substrate 210 as in the previous embodiment.

Differently from the previous embodiment of FIGS. 21 to 24, a plurality of storage electrode lines 131a and 131b are formed on the substrate 110 at the same layer as the gate lines 121.

Each of the storage electrode lines 131a and 131b extends substantially in the transverse direction and is disposed between two adjacent gate lines 121 and respectively close to the two gate lines 121. Each storage electrode line 131a and 131b includes a plurality of projections forming a plurality of storage electrodes 135a and 135b. The storage electrodes 135a and 135b are expanded to be larger than the other portions, and the storage electrode lines 131a and 131b substantially have inversion symmetry with respect to an imaginary transverse line bisecting the first and the second pixel electrodes 190a and 190b.

Each drain electrode 175 includes a plurality of expansions 175a and 175b respectively overlapping the storage electrodes 135a and 135b and having rectangular forms. It is preferable that the area of the expansions 175a and 175b of the drain electrodes 175 are minimized to maximize the area of the storage electrodes 135a and 135b which are not covered by the expansions 175a and 175b, and the expansions 175a and 175b substantially have inversion symmetry with respect to an imaginary transverse line bisecting the first and the second pixel electrodes 190a and 190b.

Also, each drain electrode 175 includes a coupling electrode 176 which is disposed in the center portion enclosed the gate lines 121 and the data lines 171, and a plurality of connections 177a and 177b respectively connecting the coupling electrode 176 and the expansions 175a and 175b.

The lower passivation layer 180p has a plurality of contact holes 185a and 185b respectively exposing the expansions 175a and 175b of the drain electrodes 175.

The color filters 230 as an upper passivation layer have a plurality of openings 235a and 235b respectively exposing the lower passivation layer 180p on the storage electrodes 135a and 135b and the expansions 175a and 175b of the drain electrodes 175, and a plurality of openings 176 respectively exposing the lower passivation layer 180p on the coupling electrodes 176.

The pair of first and second pixel electrodes 190a and 190b engages with each other interposing a gap including the cutouts 93a and 93b. The first pixel electrodes 190a are respectively connected to the expansions 175a and 175b through the contact holes 185a and 185b and directly receive data voltages from the drain electrodes 175. The second pixel electrodes 190b overlap the coupling electrode 176 of the drain electrode 175, and indirectly receive data voltages by coupling with the first pixel electrodes 190a. At this time, because the coupling electrodes 176 and the second pixel electrodes 190b for the coupling capacitance overlap each other only via the lower passivation layer 180p in the opening 236 of the color filters 230, sufficient coupling capacitance may be provided with a minimized area, such that the aperture ratio of the pixels may be maximized. Furthermore, because the first pixel electrodes 190a and the storage electrodes 135a and 135b of the storage capacitor overlap each other through the openings 235a and 235b of the color filters 230 that are larger than the drain electrodes 175 only via the lower passivation layer 180p and the gate insulating layer 140, which are made of inorganic material, sufficient storage capacitance may be provided with a minimized area, such that the aperture ratio of the pixels may be maximized.

The pair of the first and the second pixel electrodes 190a and 190b occupy the greater area enclosed by the gate lines 121 and the data lines 171, and their outer boundary is substantially shaped as a rectangle.

The first electrodes 190a includes an upper half and a lower half which are divided from each other and disposed at the upper and lower positions with respect to the second electrodes 190b. The lower and upper halves of the first pixel electrodes 190a are connected to the lower and upper expansions 175a and 175b of the drain electrodes 175 through contact holes 185a and 185b, respectively. The gaps 93a and 93b dividing the first and the second halves of the first electrode 190a, and the second pixel electrode 190b make an angle of about 45 degrees with the gate lines 121, and substantially have inversion symmetry with respect to an imaginary transverse center line bisecting the first and second pixel electrodes 190a and 190b. Accordingly, the second pixel electrode 190b is between the first and second halves of the first electrode 190a, and the first and second pixel electrodes 190a and 190b substantially have inversion symmetry with respect to an imaginary transverse center line bisecting the first and second pixel electrodes 190a and 190b.

As described above, the second pixel electrode 190b is electrically coupled with the first pixel electrode 190a. Referring to FIG. 30, the data voltages supplied to the data lines 171 are directly applied to the two portions of the first pixel electrode 190a through the TFT Q, while the voltages of the second pixel electrodes 190b coupled with the first pixel electrodes 190a are varied. In this embodiment, the absolute value of the voltages of the second pixel electrodes 190b is always smaller than that of the first pixel electrodes 190a, and this will be explained in detail.

Referring to FIG. 30, a pixel of the LCD includes a TFT Q, a first subpixel including a first capacitor Clca and a first storage capacitor Cst, a second subpixel including a second LC capacitor Clcb, and a coupling capacitor Ccp.

The first LC capacitor Clca includes the first pixel electrodes 190a as one terminal, a portion of the common electrode 270 corresponding thereto as the other terminal, and a portion of the LC layer 3 disposed therebetween as a dielectric. Similarly, the second LC capacitor Clcb includes a second pixel electrode 190b as one terminal, a portion of the common electrode 270 corresponding thereto as the other terminal, and a portion of the LC layer 3 disposed thereon as a dielectric.

The storage capacitor Cst includes lower and upper expansions 175a and 175b of a drain electrode 175, and a first pixel electrode 190a as one terminal, lower and upper storage electrodes 135a and 135b as the other terminal, and a portion of the gate insulating layer 140 and the lower passivation layer 190p disposed therebetween as a dielectric. The coupling capacitor Ccp includes a second pixel electrode 190b as one terminal, a coupling electrode 176 as the other terminal, and portions of the lower passivation layer 180p disposed therebetween as a dielectric.

The first LC capacitor Clca and the storage capacitor Cst are connected in parallel to a drain of the TFT Q. The coupling capacitor Ccp is connected between the drain of the TFT Q and the second LC capacitor Clcb. The common electrode 270 is supplied with a common voltage Vcom and the storage electrode lines 131a and 131b may be supplied with the common voltage Vcom.

The TFT Q applies data voltages from a data line 171 to the first LC capacitor Clca and the coupling capacitor Ccp in response to a gate signal from a gate line 121, and the coupling capacitor Ccp transmits the data voltage with a modified magnitude to the second LC capacitor Clcb.

If the storage electrode line 131a and 131b are supplied with the common voltage Vcom and each of the capacitors Clca, Cst, Clcb, and Ccp and the capacitance thereof are denoted as the same reference characters, the voltage Vb charged across the second LC capacitor Clcb is given by:

$$Vb=Va\times[Ccp/(Ccp+Clcb)],$$

where Va denotes the voltage of the first LC capacitor Clca.

Since the term Ccp/(Ccp+Clcb) is smaller than one, the voltage Vb of the second LC capacitor Clcb is greater than that of the first LC capacitor Clca. This inequality may be also true for a case in which the voltage of the storage electrode lines 131a and 131b is not equal to the common voltage Vcom.

When the potential difference is generated across the first LC capacitor Clca or the second LC capacitor Clcb, an electric field substantially perpendicular to the surfaces of the panels 100 and 200 is generated in the LC layer 3, and both the first and the second pixel electrodes 190a and 190b and the common electrode 190 are commonly referred to as field generating electrodes hereinafter. Then, the LC molecules in the LC layer 3 tilt in response to the electric field such that their long axes are perpendicular to the field direction. The degree of the tilt of the LC molecules determines the variation of the polarization of light incident on the LC layer 3, and the variation of the light polarization is transformed into the variation of the light transmittance by the polarizers 12 and 22. In this way, the LCD displays images.

The tilt angle of the LC molecules depends on the strength of the electric field. Since the voltage Va of the first LC capacitor Clca and the voltage Va of the second LC capacitor Clcb are different from each other, the tilt direction of the LC molecules in the first subpixel is different from that in the second subpixel, and thus the luminances of the two subpixels are different. Accordingly, while maintaining the average luminance of the two subpixels within a target luminance, the voltages Va and Vb of the first and second subpixels can be adjusted so that an image viewed from a lateral side is the closest to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area and distance between the coupling electrode 176 and the second pixel electrode 190b. For example, the distance between the coupling electrode 176 and the second pixel electrode 190b becomes large when the coupling electrode 176 is moved to the position of the gate lines 121. Preferably, the voltage Vb of the second LC capacitor Clcb is from about 0.6 to about 0.8 times the voltage Va of the first LC capacitor Clca.

The voltage Vb charged in the second LC capacitor Clcb may be larger than the voltage Va of the first LC capacitor Clca. This can be realized by pre-charging the second LC capacitor Clcb with a predetermined voltage such as the common voltage Vcom.

The area ratio of the first pixel electrodes 190a and the second pixel electrode 190b is preferably from about 1:0.85 to about 1:1.15, and the number of second pixel electrodes coupled with the first pixel electrodes 190a may be changed.

As described above, this invention simplifies the manufacturing process by patterning the layers through a single photolithography process using a photoresist including a middle thickness.

Also, because the inorganic insulating layer as a dielectric of the storage capacitor is only disposed by removing a semiconductor material between the pixel electrode and the storage electrode lines, a uniform storage capacitance may be provided, and the storage capacitance may be maximized in the optimized area. Accordingly, the characteristics of the LCD may be enhanced and an aperture ratio of the pixels may be increased.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel, comprising:
   a gate line;
   a data line intersecting the gate line;
   a storage electrode apart from the gate line and the data line;
   a semiconductor disposed under the storage electrode and contacting the storage electrode;
   a thin film transistor connected to the gate line and the data line and having a drain electrode formed of the same layer as the storage electrode;
   a pixel electrode connected to the drain electrode and electrically separated from the storage electrode;
   a first insulating layer over the storage electrode and the drain electrode and disposed under the pixel electrode;
   a second insulating layer disposed on the first insulating layer, and having an opening exposing the first insulating layer on the storage electrode,
   a shielding electrode disposed in the same layer as the pixel electrode and transmitting a common voltage, the shielding electrode contacting the storage electrode,
   wherein the shielding electrode comprises a first portion extending along the data line and covering the data line.

2. The thin film transistor array panel of claim 1, wherein the first insulating layer is made of inorganic material.

3. The thin film transistor array panel of claim 2, wherein the second insulating layer is made of organic material.

4. The thin film transistor array panel of claim 1, wherein the shielding electrode and the pixel electrode are disposed on the first insulating layer and the second insulating layer.

5. The thin film transistor array panel of claim 1, wherein the shielding electrode is extended to the data line.

6. The thin film transistor array panel of claim 5, wherein the shielding electrode completely covers the boundaries of the data line.

7. The thin film transistor array panel of claim 1, wherein the shielding electrode overlaps at least a portion of the gate line.

8. The thin film transistor array panel of claim 7, wherein the shielding electrode is extended to the data line and the gate line.

9. The thin film transistor array panel of claim 8, wherein the width of the shielding electrode is larger than that of the data line and smaller than that of the gate line.

10. A thin film transistor array panel, comprising:
    a gate line formed on an insulating substrate;
    a gate insulating layer formed on the gate line;
    a first semiconductor formed on the gate insulating layer;
    a data line and a drain electrode formed on the first semiconductor, the data line and the drain electrode being separate from each other;
    a storage conductor formed on the gate insulating layer and formed of the same layer as the drain electrode;
    a second semiconductor made at the same layer as the first semiconductor and disposed under the storage conductor and contacting the storage conductor;
    a first passivation layer formed on the storage conductor, the data line, and the drain electrode;

a second passivation layer formed on the first passivation layer and having an opening exposing the first passivation layer corresponding to the storage conductor;

a pixel electrode connected to the drain electrode and overlapping the storage conductor via the first passivation layer in the opening;

a shielding electrode disposed in the same layer as the pixel electrode and transmitting a common voltage, the shielding electrode contacting the storage electrode, wherein the shielding electrode comprises a first portion extending along the data line and covering the data line.

11. The thin film transistor array panel of claim 10, wherein the first passivation layer is thinner than the second passivation layer.

12. The thin film transistor array panel of claim 10, wherein the first passivation layer includes inorganic material or the second passivation layer includes organic material.

13. The thin film transistor array panel of claim 10, wherein the first semiconductor, except for a portion between the data line and the drain electrode, has the same plane shape as the data line and the drain electrode.

14. The thin film transistor array panel of claim 10, wherein the first semiconductor is made of amorphous silicon.

15. The thin film transistor array panel of claim 10, wherein the shielding electrode is formed on the second passivation layer and overlaps at least a portion of the gate line and the data line.

16. The thin film transistor array panel of claim 15, wherein the first passivation layer and the second passivation layer have a contact hole exposing the storage conductor, and the storage conductor is connected to the shielding electrode through the contact hole.

17. The thin film transistor array panel of claim 1, wherein the shielding electrode includes a protrusion portion having a shape, in a plan view, that protrudes away from the data line and ends over a portion of the storage conductor with a space between the protrusion portion and the gate lines on each side.

18. The thin film transistor array panel of claim 10, wherein the shielding electrode includes a protrusion portion having a shape, in a plan view, that protrudes away from the data line and ends over a portion of the storage conductor with a space between the protrusion portion and the gate lines on each side.

* * * * *